(12) United States Patent
Li et al.

(10) Patent No.: US 8,626,444 B2
(45) Date of Patent: Jan. 7, 2014

(54) SAFETY BASED ROAD MAP NAVIGATION

(75) Inventors: Mo Li, Hong Kong (CN); Yunhao Liu, Hong Kong (CN); Jiliang Wang, Hong Kong (CN); Xi Zhou, Shanghai (CN); Jinsong Han, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 906 days.

(21) Appl. No.: 12/720,889

(22) Filed: Mar. 10, 2010

(65) Prior Publication Data
US 2010/0235088 A1 Sep. 16, 2010

Related U.S. Application Data

(60) Provisional application No. 61/202,597, filed on Mar. 16, 2009.

(51) Int. Cl.
*G01C 21/34* (2006.01)

(52) U.S. Cl.
USPC ............. 701/533; 701/23; 701/532; 370/238; 370/392

(58) Field of Classification Search
USPC ................... 701/23, 532, 533; 370/238, 392
See application file for complete search history.

(56) References Cited

U.S. PATENT DOCUMENTS

| | | | |
|---|---|---|---|
| 6,108,597 A | 8/2000 | Kirchner et al. | |
| 7,110,882 B2 | 9/2006 | Moser et al. | |
| 7,233,864 B2 | 6/2007 | Moser et al. | |
| 7,336,958 B2 | 2/2008 | Kawasaki et al. | |
| 7,609,644 B2 * | 10/2009 | Tateson | 370/252 |
| 7,715,396 B2 * | 5/2010 | Castro et al. | 370/392 |
| 7,764,617 B2 * | 7/2010 | Cain et al. | 370/238 |
| 2005/0010364 A1 | 1/2005 | Moser et al. | |
| 2005/0064871 A1 | 3/2005 | Kawasaki et al. | |
| 2005/0193226 A1 * | 9/2005 | Ahmed et al. | 714/4 |
| 2005/0203681 A1 * | 9/2005 | Minor, Jr. | 701/23 |
| 2006/0265129 A1 | 11/2006 | Moser et al. | |
| 2007/0001904 A1 | 1/2007 | Mendelson | |
| 2007/0042711 A1 | 2/2007 | Lim et al. | |
| 2007/0060098 A1 * | 3/2007 | McCoy | 455/404.2 |
| 2007/0091805 A1 * | 4/2007 | Ramprashad et al. | 370/230.1 |
| 2007/0168412 A1 * | 7/2007 | Devaul | 709/202 |
| 2007/0223310 A1 * | 9/2007 | Tran | 367/77 |
| 2007/0291682 A1 | 12/2007 | Anjum | |
| 2008/0080441 A1 | 4/2008 | Park et al. | |
| 2008/0145045 A1 | 6/2008 | Chen et al. | |
| 2010/0317420 A1 * | 12/2010 | Hoffberg | 463/1 |

OTHER PUBLICATIONS

Batalin et al, Mobile Robot Navigation using a Sensor Network, IEEE 2004.*
Yao, et al. "Backbone-based Roadmaps for Robot Navigation in Sensor Networks," in Proceedings of IEEE International Conference on Robotics and Automation, 2008, 7 pages.
Tseng, et al. "Wireless Sensor Networks for Emergency Navigation," IEEE Computer Society, 2006, 8 pages.

(Continued)

*Primary Examiner* — James Trammell
*Assistant Examiner* — Truc M Do
(74) *Attorney, Agent, or Firm* — Turocy & Watson, LLP

(57) ABSTRACT

The disclosed subject matter relates to an architecture that can facilitate safety-oriented navigation through a local environment that presents emergency dynamics. The architecture can facilitate monitoring of deployed sensors constituting a sensor network, even for cases in which sensor locations are not known in advance such as for rapid or random deployment.

16 Claims, 17 Drawing Sheets

(56) References Cited

OTHER PUBLICATIONS

Office Action for Chinese Patent Application No. 201010138681.X dated Sep. 22, 2011, 6 pages.

Bruck, et al. MAP: Medial Axis Based Geometric Routing in Sensor Network. In Proceedings of ACM MobiCom, Aug. 28-Sep. 2, 2005. http://portal.acm.org/citation.cfm?id=1080829.1080839. Last accessed Mar. 5, 2010, 15 pages.

Buragohain, et al. "Distributed Navigation Algorithms for Sensor Networks," in Proceedings of IEEE INFOCOM, 2006. http://www.cs.ucsb.edu/~suri/psdir/infocom06.pdf. Last accessed Mar. 5, 2010, 12 pages.

He, et al. "Energy-Efficient Surveillance Systems Using Wireless Sensor Networks," in Proceedings of ACM MobiSys, Jun. 6-9, 2004. http://www.cs.virginia.edu/~stankovic/psfiles/ESS-V9.pdf. Last accessed Mar. 5, 2010, 14 pages.

Huang, et al. "FAR: Face-Aware Routing for Mobicast in Large-Scale Sensor Networks," in Proceedings of IEEE INFOCOM, 2004. http://portal.acm.org/citation.cfm?id=1105692&dl=GUIDE&coll=GUIDE&CFID=80591503&CFTOKEN=84667800. Last accessed Mar. 5, 2010, 32 pages.

Karp, et al. "Greedy Perimeter Stateless Routing for Wireless Networks," in Proceedings of ACM MobiCom, 2000. http://www.icir.org/bkarp/jobs/gpsr-mobicom2000.pdf. Last accessed Mar. 5, 2010, 12 pages.

Ko, et al. "Location-Aided Routing (LAR) in Mobile Ad Hoc Networks," in Proceedings of ACM MobiCom, 1998. http://portal.acm.org/citation.cfm?id=288252. Last accessed Mar. 5, 2010, 10 pages.

Lazos, et al. "Robust Position Estimation in Wireless Sensor Networks," in Proceedings of IEEE/ACM IPSN, 2005. http://www.syssec.ethz.ch/research/IPSN-05.pdf. Last accessed Mar. 5, 2010, 8 pages.

Li, et al. "Demo Abstract: Sensor Network Navigation without Locations," in Proceedings of ACM SenSys, 2008. http://www.cse.ust.hk/~limo/papers/Navigation_SenSys08_demo.pdf. Last accessed Mar. 5, 2010, 2 pages.

Li, et al. "Distributed Algorithms for Guiding Navigation across a Sensor Network," in Proceedings of ACM MobiCom, 2003. http://www.cs.cmu.edu/~mderosa/mob03.pdf. Last accessed Mar. 5, 2010, 13 pages.

Marina, et al. "Routing Performance in the Presence of Unidirectional Links in Multi-hop Wireless Networks," in Proceedings of ACM MobiHoc, 2002. http://cst.mi.fu-berlin.de/teaching/SS08/19557-P-Mobkomm/marina02routing.pdf. Last accessed Mar. 5, 2010, 12 pages.

Meguerdichian, et al. "Exposure in Wireless Ad-Hoc Sensor Networks," in Proceedings of ACM Mobicom, 2001. http://www.cs.ucla.edu/~miodrag/papers/Meguerdichian_MOBICOM_01.pdf. Last accessed Mar. 5, 2010, 12 pages.

Niculescu, et al. "Ad Hoc Positioning System (APS) using AOA," in Proceedings of IEEE INFOCOM, 2003. http://eprints.kfupm.edu.sa/22691/1/22691.pdf. Last accessed Mar. 5, 2010, 9 pages.

Park, et al. "A Scalable Approach for Reliable Downstream Data Delivery in Wireless Sensor Networks," in Proceedings of MobiHoc, 2004. http://citeseerx.ist.psu.edu/viewdoc/summary?doi=10.1.1.2.6323. Last accessed Mar. 5, 2010, 12 pages.

Savarese, et al. "Robust positioning algorithms for distributed ad-hoc wireless sensor networks," in Proceedings of USENIX, 2002. http://www.comp.nus.edu.sg/~bleong/geographic/related/savarese02robust.pdf. Last accessed Mar. 5, 2010, 10 pages.

Seada, et al. "Energy-Efficient Forwarding Strategies for Geographic Routing in Lossy Wireless Sensor Networks," in Proceedings of ACM SenSys, 2004. http://ceng.usc.edu/~bkrishna/research/papers/SeadaZunigaKrishnamachariHelmy_Sensys04.pdf. Last accessed Mar. 5, 2010, 14 pages.

Thulasiraman, et al. "Disjoint Multipath Routing to two Distinct Drains in a Multi-Drain Sensor Network," in Proceedings of IEEE INFOCOM, 2007. http://www.ece.arizona.edu/~srini/papers/Srini-2007-INFOCOM.pdf. Last accessed Mar. 5, 2010, 9 pages.

Veltri, et al. "Minimal and Maximal Exposure Path Algorithms for Wireless Embedded Sensor Networks," in Proceedings of ACM SenSys, 2003. http://www.ece.umd.edu/~gangqu/research/papers/c033.pdf. Last accessed Mar. 5, 2010, 11 pages.

Wan, et al. "Siphon: Overload Traffic Management using Multi-Radio Virtual Sinks," in Proceedings of ACM SenSys, 2005. http://comet.columbia.edu/armstrong/pubs/Siphon-senSys2005.pdf. Last accessed Mar. 5, 2010, 14 pages.

Wang, et al. "Using Mobile Relays to Prolong the Lifetime of Wireless Sensor Networks," in Proceedings of ACM MobiCom, 2005. http://www.ece.nus.edu.sg/stfpage/elevs/Pubs/mobicom_cam.pdf. Last accessed Mar. 5, 2010, 14 pages.

Xu, et al. "A Wireless Sensor Network for Structural Monitoring," in Proceedings of ACM SenSys, 2004. http://enl.usc.edu//papers/cache/xu_sensys04.pdf. Last accessed Mar. 5, 2010, 12 pages.

Berg, et al. Computational Geometry: Algorithms and Applications, p. 267-289, 2nd Edition: Springer-Verlag, 2000.

Latombe. Robot Motion Planning: Kluwer, p. 153-155, 1992.

Naik, et al. "Sprinkler: A Reliable and Energy Efficient Data Dissemination Service for Wireless Embedded Devices," in Proceedings of IEEE RTSS, 2005.

\* cited by examiner

SAFETY BASED ROAD MAP NAVIGATION

CROSS-REFERENCE TO RELATED APPLICATIONS

This application claims the benefit of U.S. Provisional Application Ser. No. 61/202,597 filed on Mar. 16, 2009 and entitled, "ROAD MAP BASED NAVIGATION IN SENSOR NETWORKS SYSTEM AND METHOD" for all purposes. The entirety of this application is incorporated herein by reference.

BACKGROUND

Path planning and navigation have been studied for many years in connection with a variety of fields of study such as, for example, in the fields of Robotics and Computational Geometry. In these or similar contexts, environmental conditions are presumed to be globally available and such information is further presumed to be universally shared with all other elements. Thus, centralized computing can be conducted with nearly perfect global knowledge of the environment.

However, navigation through a wireless sensor network presents a number of difficulties. For example, in such cases, the navigation typically must be performed in a distributed manner over a self-organized network consisting of a huge number of nodes. Thus, environmental information typically must be rapidly captured with respect to the distributed nodes. In addition, such navigation architecture would, in many cases, be required to rapidly adapt and react to environmental variations.

Previous research has been directed toward problems relating to solving the minimum or maximum exposure path in a network. In particular, conventional literature largely relies on exhaustive search over the entire network, which can be too slow for many practical applications. In addition, conventional systems have also proposed the use of heuristics to compute paths in a distributed manner. However, these solutions treat individual sensor nodes as adversaries rather than utilizing them as infrastructures and thus do not provide an adequate solution for navigation in dynamic environments.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The subject matter disclosed herein, in one or more aspects thereof, comprises an architecture that can determine safety-oriented navigation paths in connection with a wireless sensor network deployed in a hazardous environment. Appreciably, the hazardous environment differs from a static environment that can be effectively navigated by avoiding certain predetermined locations, since hazards can be newly arisen, migrate to different locations, or dissipate entirely.

In accordance therewith and to other related ends, the architecture can employ a monitor component that can be configured to receive a hazard signal from at least one alarming sensor included in a sensor array, wherein the hazard signal indicates a detected presence of danger proximal to the at least one alarming sensor. The sensor array can be distributed in a local environment, thus, the local environment can be defined by a detection radius of the sensor array.

In addition, the architecture can include a mapping component that can be configured to construct a road map scaled to dimensions of the local environment. The road map can include a route backbone that depicts one or more recommended paths through the local environment selected based upon a distance from the detected presence of danger.

The following description and the annexed drawings set forth in detail certain illustrative aspects of one or more non-limiting embodiments. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the various embodiments when considered in conjunction with the drawings.

DETAILED DESCRIPTION

Figure 1:
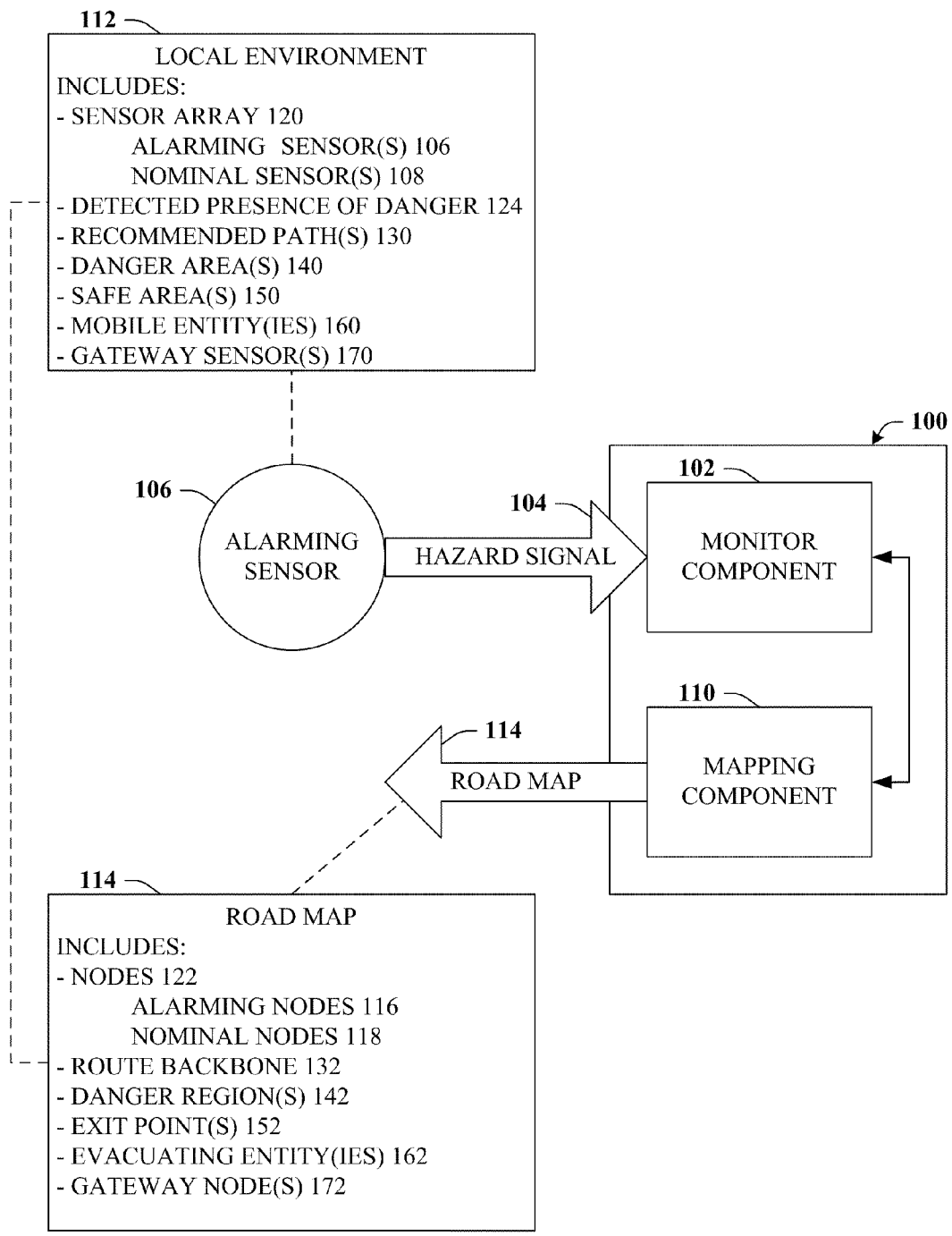
FIG. 1 illustrates a block diagram of a computer-implemented system that can determine safety-oriented navigation paths through an environment subject to emergency dynamics.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the claimed subject matter may be practiced without these specific details. In other instances, well-known structures and devices are shown in block diagram form in order to facilitate describing the various embodiments.

What is disclosed herein generally relates to a road map based navigation system and method, termed as RMB, which provides human navigation in the distributed sensor networks without relying on location information. RMB can embed a distributed road map in the sensor network, which can operate as a public infrastructure (e.g., the sensors can be treated as waypoints for constructing suitable courses or other navigation) for providing guidance information for internal inquiries. Multiple individual entities can issue queries to the road map and can be instructed with regard to recommended routes to safely avoid emergency or dangerous situations or the like. Also detailed are efficient mechanisms to update the road map system according to the variations of dangerous areas while maintaining its accuracy and effectiveness. The incurred network traffic cost is bounded by $O(\sqrt{n})$ where n is the network size. This approach is effective and highly scalable when the network size is large and multiple users are simultaneously navigated.

In general, RMB comprises four stages. They are: (1) building the road map, (2) guiding or navigating entities through suitable paths, (3) reacting to emergency dynamics, and (4) further improving route efficiency.

In broad terms, at the first stage, the basic framework (e.g., route backbone) of the road map can be constructed by concatenating the medial axis of the safe region. At the second stage, the road map framework can be utilized as a backbone for navigating different entities inside the field. An exit in one of the cells can be identified and a route connecting the exit and the internal user can be constructed. Thus, each entity can be guided through the roads to reach the destination exit.

At the third stage, the variation of dangerous areas can be categorized according to four basic types, including emerging, expanding, shrinking, and diminishing. An updating principle can then be implemented which additively rebuilds the road map according to the emergency dynamics and affects only a local district, by maintaining a status in each node in the field to record the set of the closest dangerous points to that node and the distance between a gateway. Each time a point is switched into or out of a dangerous area, only those points which have correlations to it are updated, such as considering the updated node as the closest dangerous point. The fourth stage relates to construction of shortcuts as supplements to the original recommended paths to improve route efficiency and/or traversal speed.

It should be appreciated that the embedded distributed road map system in the sensor network can provide entities navigating routes with maximum safety without relying on predetermined location information of the sensor network. Rather, the road map can be generated according to the distribution of dangerous areas and thus characterizes the features of safety in the field. The navigation system can maintain the road map as a public infrastructure, and guide different entities across the field through the same paths that are constructed or change based upon the behavior or existence of detected dangerous conditions. Such can mitigate the unnecessary overhead extent in conventional systems of individually planning routes for different users. The road map can further be updated in an event-driven manner when the dangerous areas vary.

Given that in conventional systems unawareness of location information always leads to low efficiency of the system, since additional requirements of frequent global information exchange and coordination to assist local decisions is necessitated. Moreover, global collaboration can be quite expensive in terms of reaction time, which is infeasible under many emergency situations. Accordingly, RMB addresses these issues in a scalable way. The road map provides for an updating scheme that additively rebuilds the road map system in the event of changes in dangerous areas, which involves fewer global operations, mitigates network overhead, and thereby is able to accommodate more requests simultaneously over a larger area.

As used in this application, the terms "component," "module," "system," or the like can, but need not, refer to a computer-related entity, either hardware, a combination of hardware and software, software, or software in execution. For example, a component might be, but is not limited to be, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the various embodiments may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "hazard" or "danger" generally refer to a condition extant in an environment that is potentially harmful or disruptive to the safety of some entity, such as a human, in the environment or to an action or behavior thereof. Hazards or dangers can be sufficiently serious to necessitate or encourage evacuation of the entity from the local environment or to a safe area therein.

Referring now to the drawings, with reference initially to FIG. 1, computer-implemented system 100 that can determine safety-oriented navigation paths through an environment subject to emergency dynamics is depicted. Generally, system 100 can include monitor component 102 that can be configured to receive hazard signal 104. Accordingly, monitor component 102 can be equipped with a receiver, transceiver or other suitable hardware capable of receiving an electronic signal. As depicted, hazard signal can be received from one or more alarming sensor(s) 106 included in a sensor array 120. Sensor array 120 (including alarming sensor 106) can be distributed throughout local environment 112 such that local the boundaries of local environment 112 can be defined by a detection radius of sensor array 120. Moreover, hazard signal 104 can indicate a detected presence of danger 124 (e.g., danger that is detected by at least one sensor of sensor array 120) proximal to alarming sensor 106.

As used herein, sensor array 120 as well as other references to multiple sensors are intended to refer to a sensor network in which all or a portion of the sensors in the sensor network are equipped for communication with one another, typically in a wireless manner. Typically, a sensor network comprises numerous sensors that can be spatially deployed in the field under surveillance, monitoring physical or environmental conditions, such as temperature, light, radiation, vibration, composition, sound and so on. Sensors can be randomly deployed in disaster areas or inaccessible terrain, which can enable the sensor network a wide variety of applications. Sensor networks can be specifically adapted to many applications, including, e.g., environment and habitat monitoring, battlefield surveillance, healthcare, traffic control or the like.

In more detail, a sensor can be a device that measures a physical quantity and converts it into signals which can be received and/or interpreted by suitable instruments or other sensors. Sensors can consist of a sensing unit, a processing unit, a transceiver unit, a power unit, usually a battery, as well as other suitable components, either hardware or software. The envisaged size of a single sensor node can vary from shoebox-sized nodes down to devices the size of grain of dust. Sensor nodes can communicate with one other within their communication range, classically through radio transmission, cooperatively forming the sensor network to perform a specific sensing task.

Most existing applications treat the sensor network as a media of data acquisition, concentrating on organizing a data-centric network for efficiently collecting, routing, and processing in-network sensory data. Recently, however, researchers have explored more versatile applications of sensor networks beyond simply viewing them as tools for monitoring the physical world. For example, in a field deployed with sensors capable of detecting disruptive or dangerous events like a chemical spill or outbreak of fire, the sensor network can be employed to aid navigation, thereby guiding the movements of evacuees out of danger, which is further detailed herein.

Accordingly, the disclosed subject matter particularly relates in part to utilizing a sensor network as a reactive architecture, which can facilitate guidance to locations of safety and/or away from danger. In other words, a sensor network, in the presence of hazards, focus on in-situ entity interactions with the sensor network infrastructure. Moreover, in general, it is not necessary to employ one or more sinks as data processing centers, yet there need not further be any need for collecting and/or analyzing in the aggregate all the sensory data distributed over the field. Rather, all operations can be carried out in a distributed manner between various entities (e.g., 160, 162) and the sensor network. For example, individual entities can be provided the ability to issue queries and follow the recommended routes to safely avoid emergency or dangerous situations.

To further underscore distinctions between the subject matter disclosed herein and conventional systems, it should be appreciated that existing approaches require location information associated with each sensor. In contrast, the disclosed subject matter can provide navigation without any pre-knowledge of either entity location or sensor location. It should be appreciated that in many realistic situation, where emergency conditions exist and emergency guidance is sought, an expectation of pre-known positions of the sensors is often unrealistic. By removing this constraint, sensors can be randomly deployed in a rapid manner, with very little warning and without significant preparation of the environment beforehand. Thus, the applicability of the disclosed subject matter can be greatly extended.

Furthermore, the disclosed subject matter can operate in light of emergency dynamics, which has not yet been explored by previous approaches. Moreover, an efficient updating scheme that can locally update the navigation routes when danger zones vary or migrate, which can substantially reduce network overhead and provide substantial scalability. Under realistic models, it is necessary to expect conditions in dangerous areas to be changing (e.g., emergency dynamics) in unpredictable and potentially rapid ways. Such variations will often degrade the effectiveness or even overwhelm existing designs that do not specifically consider the impact of variations of, e.g., dangerous areas. Accordingly, the disclosed subject matter can provide timely and efficient re-planning and updating of safe routes for the users in the event of variations with respect to dangerous areas.

Continuing the discussion of FIG. 1, system 100 can further include mapping component 110 that can be configured to construct road map 114 scaled to dimensions of local environment 112. As discussed, due to the inherent scalability, local environment 112 can be virtually any size, in this case, limited only by the dimensions and detection radius of sensor array 120. Road map 114 can include route backbone 132 that depicts one or more recommended paths 130 through local environment 112, which can be selected based upon a distance from detected presence of danger 124.

Given that road map 114 is intended to be a model or representation of local environment 112, there exist numerous relationships between elements physically extent in local environment 112 and modeled or virtualized elements included in road map 114 such as a relationship between the physical recommended path 130 that traverses local environment 112 and its modeled counterpart, route backbone 132 included in road map 114. For the remainder of this document, care is taken to distinguish between related elements, however, it should be appreciated that where there is little chance for confusion or ambiguity to arise, corresponding terms (such as those listed in boxes 112 and 114 respectively) might be utilized interchangeably. For example, while alarming sensor 106 refers specifically to an element of local environment 112, it should not cause confusion for the terms "alarming node" (e.g., alarming node 116, which is a corresponding representation of alarming sensor 106 constructed in road map 114) to be employed in connection with local environment 112.

Moreover, several of the terms and/or reference numerals listed in boxes 112 and 114 will be introduced or further detailed with reference to the remaining figures which are intended to be referred to in conjunction with FIG. 1.

Figure 2A:
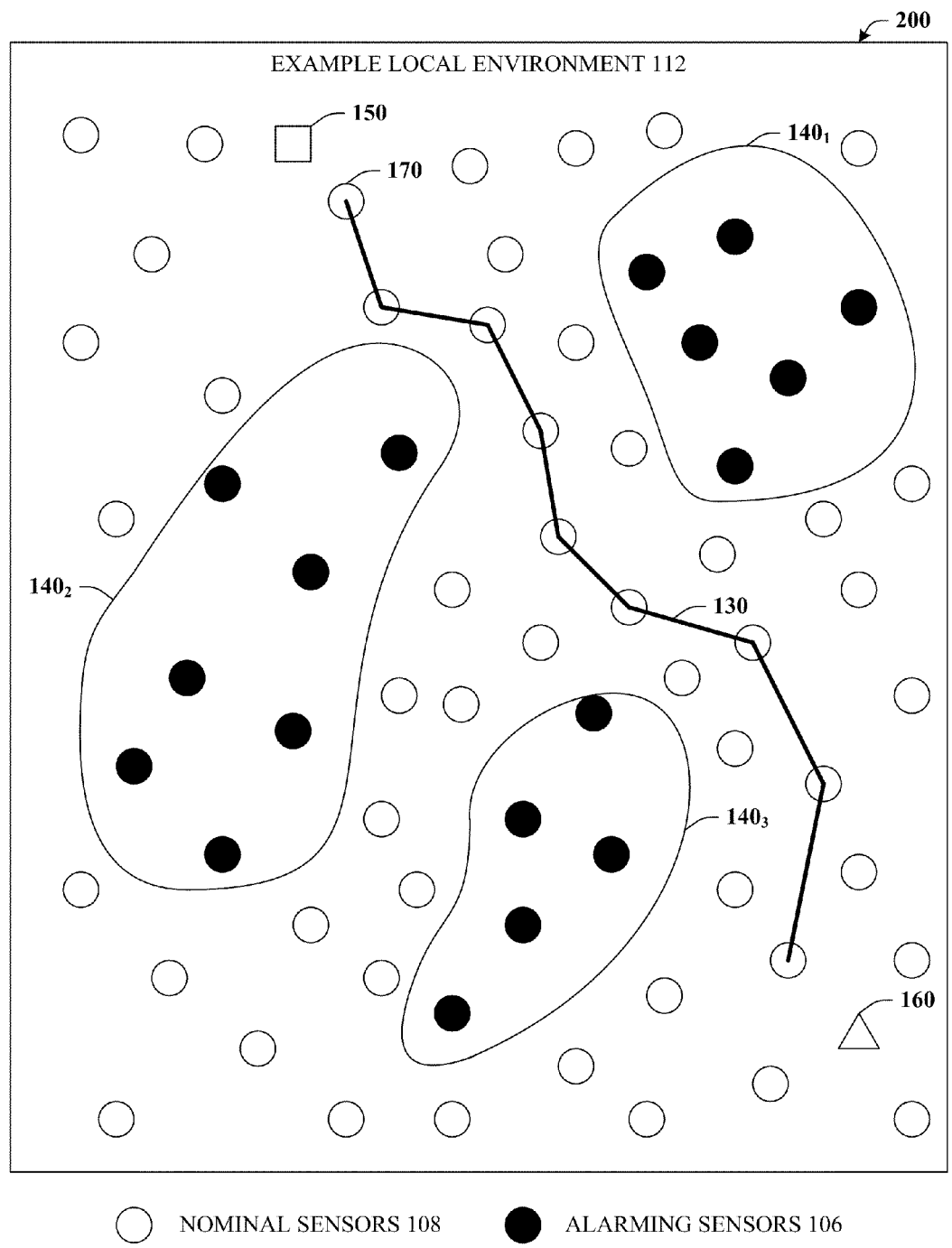
FIG. 2A depicts a block diagram of a graphic depiction of example local environment illustrating a sensor array dispersed throughout local environment.

Hence, while still referring to FIG. 1, but turning now also to FIG. 2A, graphic depiction 200 of example local environment 112 is provided. Graphic depiction 200 illustrates sensor array 120 dispersed throughout local environment. Here, as is likely to be typical, a majority of the sensors are nominal sensors 108 (depicted as white circles), for which no presence of danger 124 or other alarming condition is detected. Additionally, a number of the sensors are alarming sensors 106 that have detected a presence of danger 124. By combining detected presences of danger for all alarming sensors 106, we see three distinct danger areas $140_1$-$140_3$. Also depicted are an example recommended path 130 that can be constructed based upon an identification of sensors in the sensor array that are a certain minimum distance from one or more danger areas 140. Furthermore, safe area 150, mobility entity 160 and gateway sensor 170 also reside in local environment 112. Once these elements are connected to recommended path 130, instructions for a safe evacuation of mobile entity can be provided. As an example, graphic depiction 200 can represent an individual (e.g., mobile entity 160) who located in a forest, with the danger regions 140 indicated detected presence of a fire.

Figure 2B:
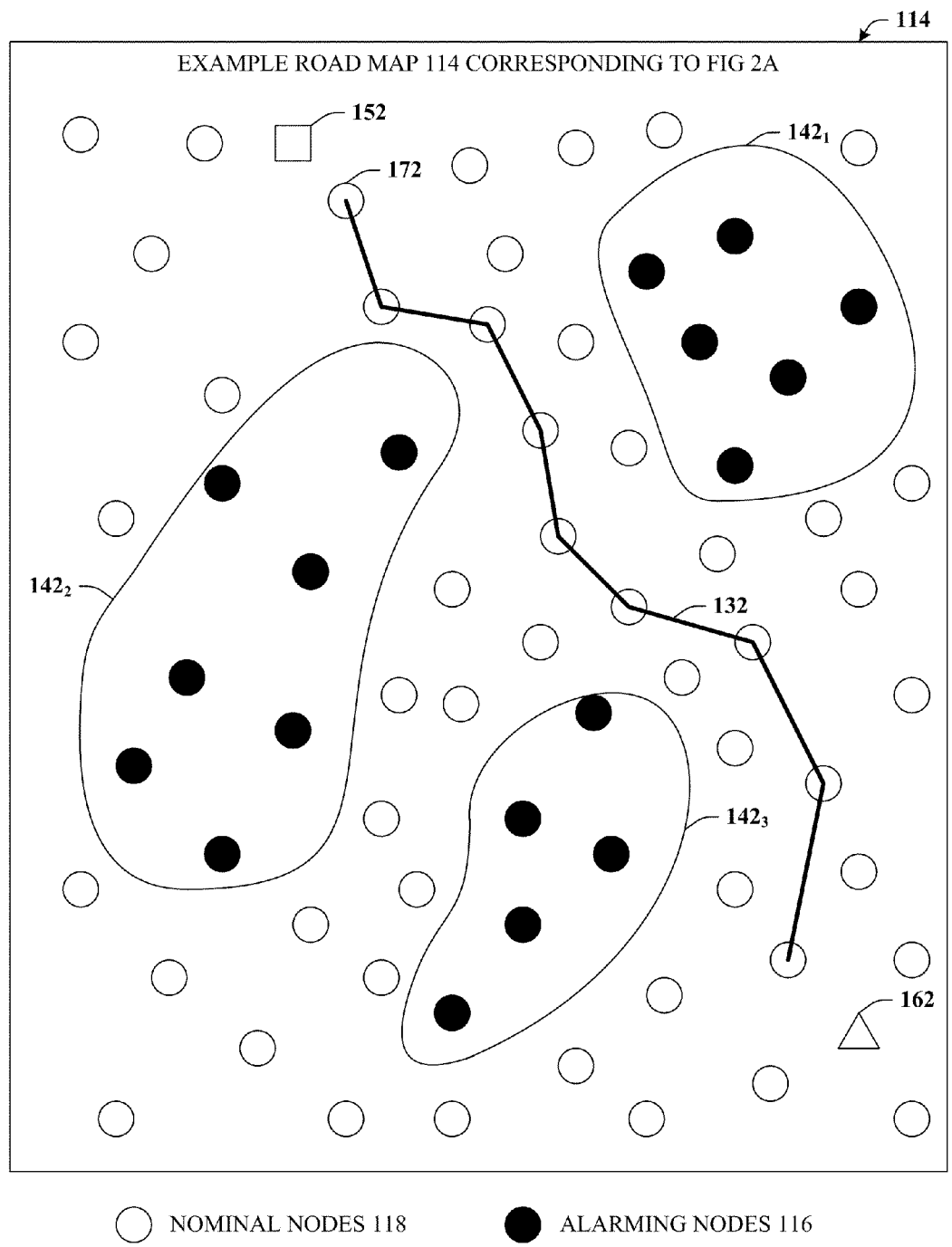
FIG. 2B depicts a block diagram of an example road map corresponding to FIG. 2A.

Similarly, with reference to FIG. 2B, an example road map 114 corresponding to FIG. 2A is illustrated. Since road map 114 is intended to represent a model of local environment 112, the example road map 114 includes corresponding elements, such as route backbone 132, danger regions 142 (corresponding to the danger areas 140 of local environment 112), exit point 152, evacuating entity 162 and gateway node 172.

While still referencing FIGS. 2A and 2B, and continuing the discussion of FIG. 1, it should be appreciated that in one or more aspect, route backbone 132 can comprises a set of edges that join a sequence of adjacent nodes that correspond to respective locations within local environment 112 of nominal sensors 108 included in the sensor array. Accordingly, mapping component 110 can identify at least one safe area 150 within local environment 112 and can plot exit point 152 on road map 114, wherein exit point 152 can correspond to the at least one safe area 150.

Moreover, mapping component 110 can also identify at least one mobile entity 160 extant in the local environment 112 and can plot at least one evacuating entity 162 on the road map connected to a proximal point of route backbone 132. Furthermore, mapping component 110 can connect the at least one exit point 152 to the route backbone 132 with an edge that (1) intersects a proximal point, denoted a gateway (e.g., 170, 172), on the route backbone and (2) depicts recommended path 130 through local environment 112.

It should be understood that in one or more aspect, mapping component 110 can connect the at least one exit point 152 to gateway 172 of route backbone based upon a concatenation of a medial axis of exit point 152, wherein the medial axis can include a set of points, each of which is a minimum distance from at least two danger regions 142. These danger regions 142 can be readily detected since mapping component 110 can include in road map 114 at least one danger region 142 that corresponds to danger area(s) 140 a in the local environment 114 that encompasses a contiguous set of alarming sensors 106. Moreover, when considering regions beyond the scope of local environment 112, which can relate to how the borders of local environment 112 are treated, various options exist. For example, in one aspect mapping component 110 can treat regions beyond the local environment 112 that correspond to areas outside the detection radius of sensor array 120 as one or more of the at least one danger region 142. Additionally or alternatively, mapping component 110 can treat at least one region beyond the local environment 112 that corresponds to areas outside the detection radius of sensor array 120 as a safe region 150, thus plotting an exit point 152 on road map 114 to correspond to the safe region 150.

In accordance with the above, one can consider the scenario of sensor network navigation on the field under emergencies, where there might be several dangerous areas that threaten the safety of human beings or other mobile entities. As discussed, a wireless sensor network can be deployed on the field, and each entity can be equipped with a communicating device like 802.15.4 compatible Personal Digital Assistant (PDA) that can interface with the sensors. By measuring the strength and direction of wireless signals, the entity is able to track any targeted sensor node without fore knowledge of the location of the sensor. An objective of a successful navigation is to plan a path for the user to one or more pre-known exits on the field which lead to safe departure, bypassing all dangerous areas. Thus, the recommended route can be represented by a sequence of sensor nodes and the entity can be directed along those sensor nodes.

Figure 3:
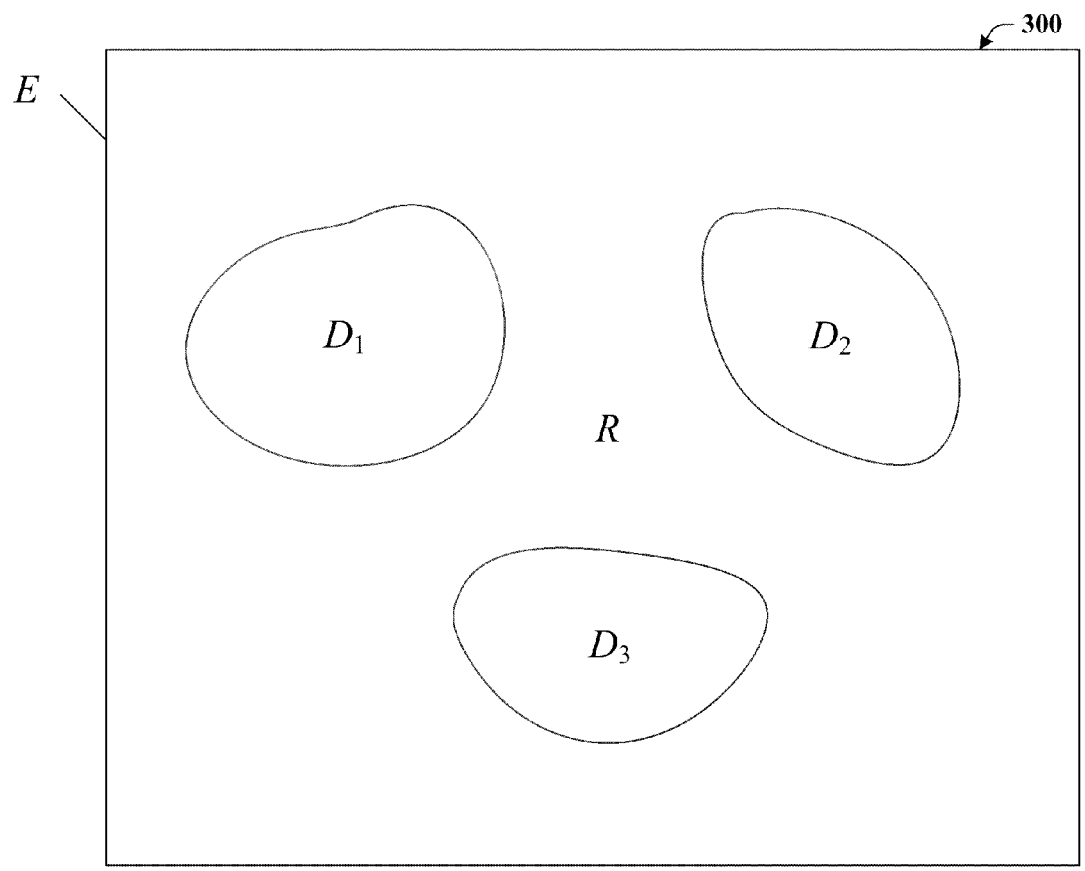
FIG. 3 provides block diagram of a graphic model presented illustrating an example outline of danger regions.

Referring now to FIG. 3, graphic model 300 is presented illustrating an example outline of danger regions 142. As noted supra, given that an initial stage is to build the road map, RMB can treat any targeted area or curve as a set of points and each point can correspond to a sensor node. Therefore, let the entire emergent field be region E. Further, let n be the number of dangerous areas and the i-th dangerous area is $D_i=\{d|d$ is the alarming sensor node which detects the dangerous event$\}$, i=1 . . . n. The combination of dangerous areas is region $$D = \bigcup_{i=1}^{n} D_i$$

and the remained safe region is R=E\D, as shown in FIG. 3. Accordingly, the road map is built in region R, since entities are presumed to only move outside dangerous areas for ensuring safety.

To provide more detail relating to construction of route backbone 132, consider that each sensor node can maintain a list of status information s, a non-limiting example of which is shown in Table I below.

TABLE I

| variable | type | Size (bits) |
|---|---|---|
| s.danger | danger ID | 8 |
| s.border | Y/N | 8 |
| s.mDist | hops | 8 |
| s.mSet | node IDs | 80 |

TABLE I-continued

| variable | type | Size (bits) |
|---|---|---|
| s.road | Y/N | 8 |
| s.nextHop | node ID | 8 |
| s.rDist | hops | 8 |
| s.potential | Value | 8 |

In further detail, s.danger marks whether the current node resides within or outside a dangerous area. In this example, s.danger is 0 if the current node is outside the dangerous area and s.danger is set to the ID of the dangerous area if the current node resides in such a dangerous area. Appreciably, s.border can be a Boolean variable that indicates whether the current node is on the boundary of the dangerous area. Moreover, s.mDist records the distance (hops) from the current node to the nearest dangerous area, and s.mSet records the set of nodes on the boundaries of dangerous areas that are of s.mDist to the current node. s.road is a Boolean variable that indicates whether the current node is on the road map backbone. s.nextHop stores the ID of the next hop node along the path direction on the road. s.rDist records the minimum distance (hops) to the dangerous areas on the path from the current node to the exit. s.potential records the potential value of the ordinary nodes For each dangerous area, every node inside the dangerous area can generate a random number as s.danger and flood that number across the danger area. The smallest number can be selected as the ID of the associated dangerous area, which is further detailed with reference to FIG. 4.

Figure 4:
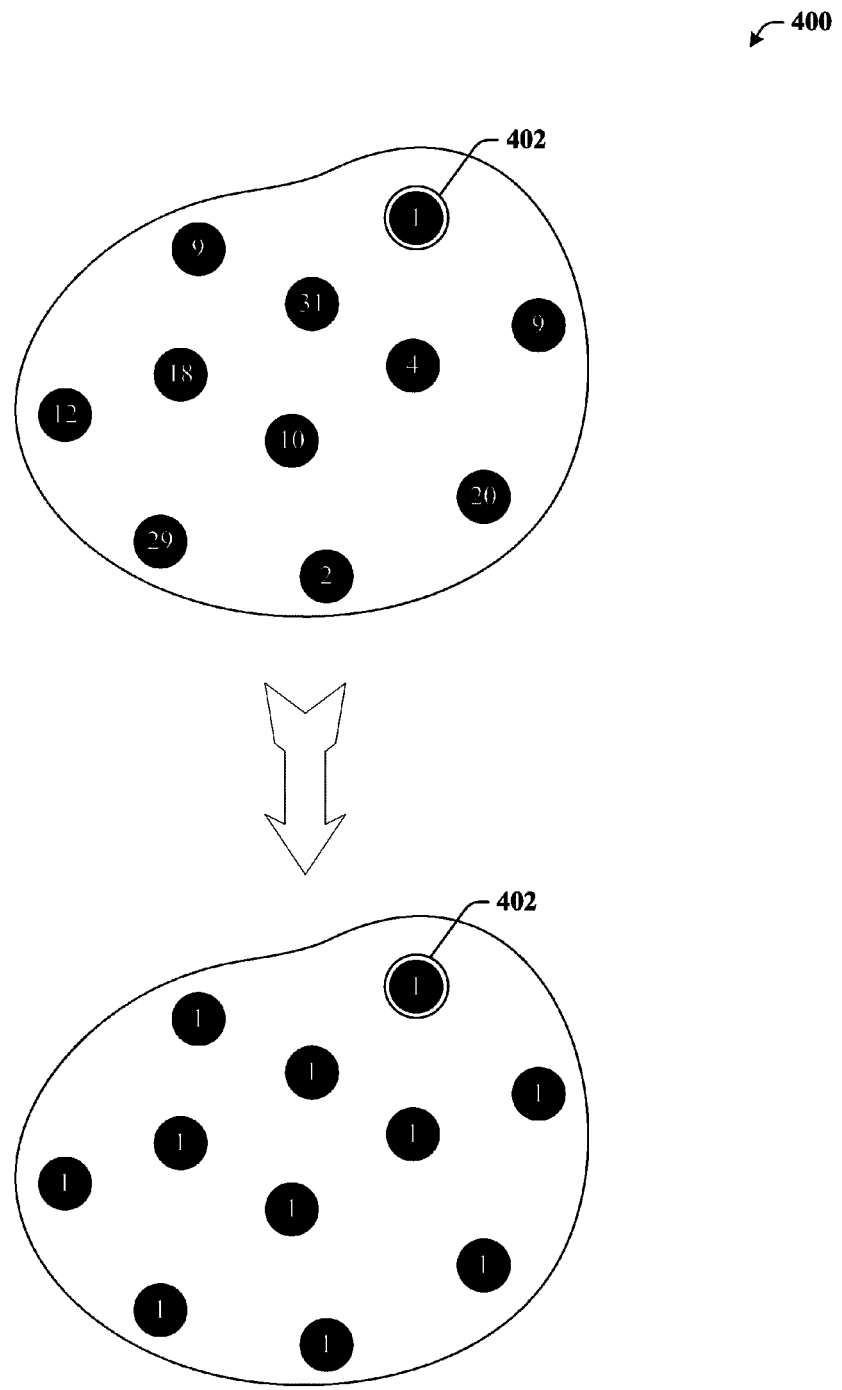
FIG. 4 depicts a block diagram of a graphic depiction illustrating an example scheme for discovering or defining boundaries for danger areas.

Turning now to FIG. 4, graphic depiction 400 illustrates an example scheme for discovering or defining boundaries for danger areas. Based upon the foregoing alarming node 402 has generated the smallest random number, 1. Thus, each node can set the s.danger to this value. For the example in the upper portion of FIG. 4, the smallest number of the dangerous area is 1. Accordingly, every node inside that area should update each s.danger to 1, which is illustrated in the lower portion of FIG. 4. Furthermore, nodes beyond the confines of the dangerous areas set s.danger to 0, since these nodes are nominal and/or not in an alarming state, which is depicted in connection with FIG. 5.

Figure 5:
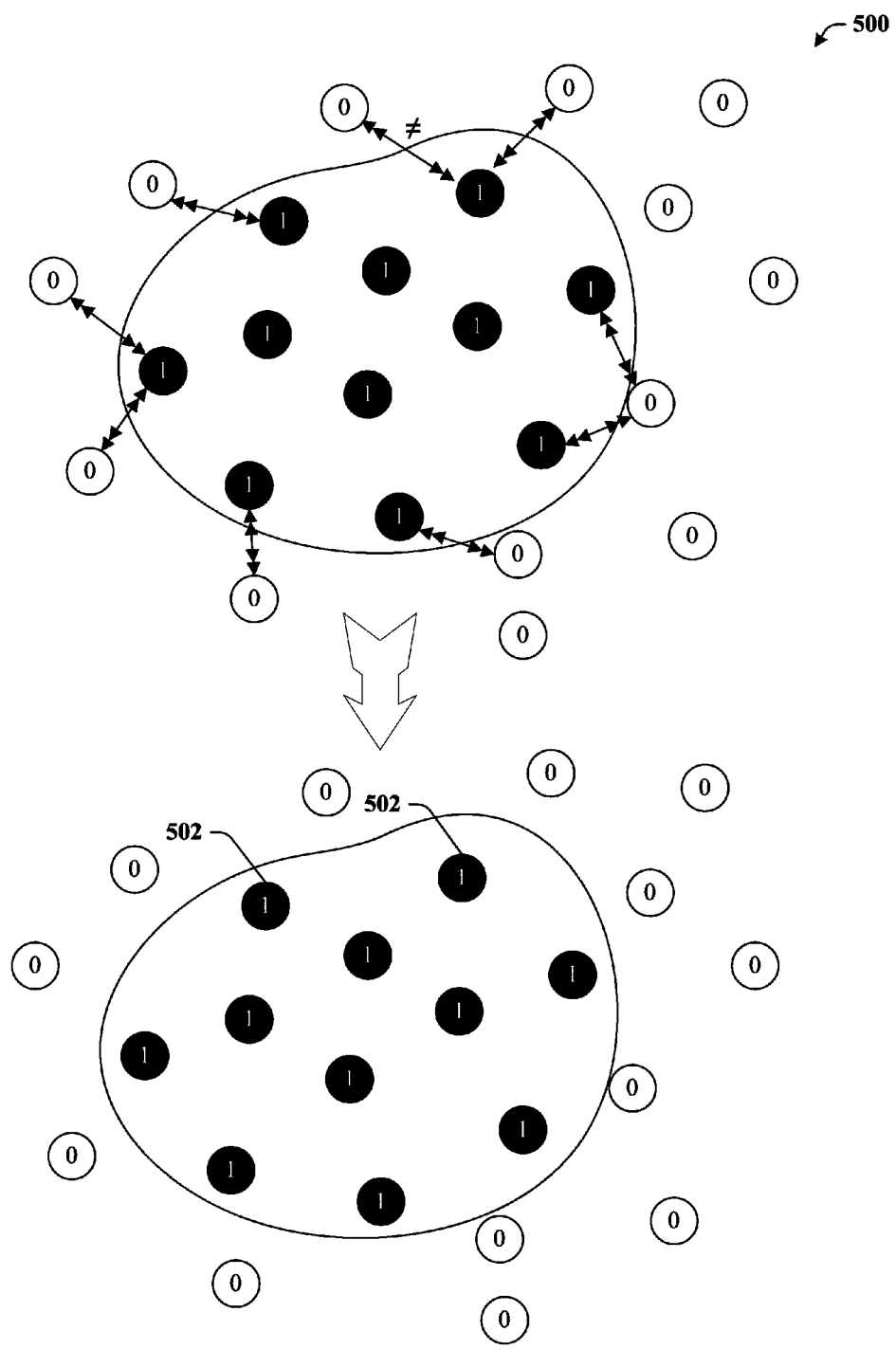
FIG. 5 provides block diagram of a graphic depiction illustrating boundary nodes with an upper portion associated with random IDs and a lower portion associated with like IDs.

FIG. 5 provides graphic depiction 500 illustrating boundary nodes, again with an upper portion associated with random IDs and a lower portion associated with like IDs. With alarming nodes all set to 1, and nominal nodes set to 0, it is readily apparent that pairs of neighboring sensors with different outcomes will represent boundary nodes 502 when instant node is an alarming node 106. In other words s.border can be set for the nodes within a dangerous area that detect a comparison inequality for s.danger, signifying these nodes are boundary nodes. In the lower portion of FIG. 5, this example depicts a total of 7 boundary nodes that are grey-filled, two of which are labeled with reference numeral 502.

Figure 6:
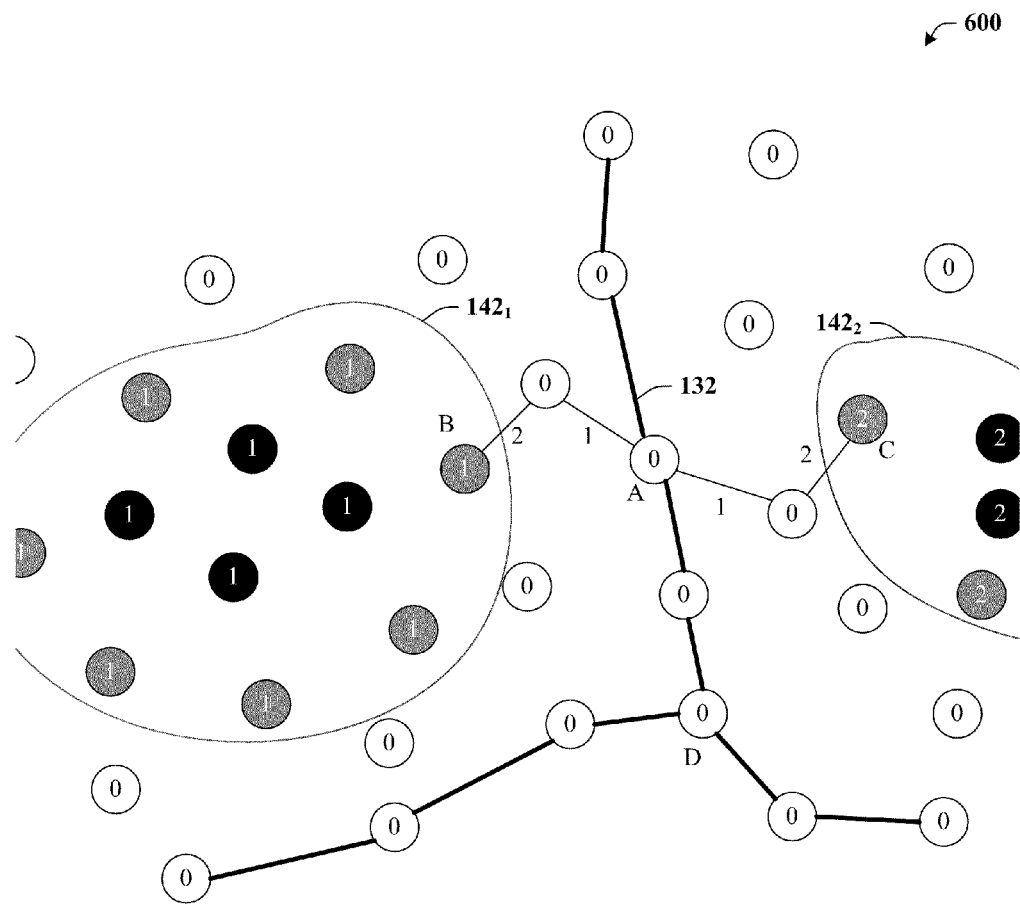
FIG. 6 depicts a block diagram of a graphic depiction illustrating in more detail construction of the route backbone.

Referring now to FIG. 6, graphic depiction 600 illustrating in more detail construction of the route backbone is provided. In particular, graphic depiction 600 illustrated a set of nominal nodes (white circles) and a set of alarming nodes that are further distinguished as either standard alarming nodes 106 (black fill) or boundary nodes 502 (grey fill). The set of alarming nodes are further presented in two distinct danger regions 142, distinguished in this case by subscripts.

Boundaries nodes 502 for danger regions 142 can flood the status information to the rest of the field. Accordingly, each node can record the distance to the nearest boundary node 502 in s.mDist and the set of nodes on the borders of dangerous areas that are s.mDist away in s.mSet. The node whose s.mSet contains boundary nodes on two or more dangerous areas can set s.road to Y, signifying that at least one portion of route backbone 132 will intersect the node. For example in graphic depiction 600 illustrates node A is 2-hops away from both the nearest boundary nodes 502, B and C, and therefore records s.mDist=2 and s.mSet={B, C}. Since B and C are from different dangerous areas, A sets s.road=Y.

Furthermore, let the medial axis Z={z|z is the sensor node with s.road=Y}. The basic framework (e.g., route backbone 132) of the road map 114 can be constructed by concatenating the medial axis of region R as illustrated. Thus, in one or more aspect of the disclosed subject matter, mapping component 110 can assign a potential value to a node included in road map 114 based at least in part upon data received from a corresponding sensor, wherein the potential value is inversely proportional to a distance between the corresponding sensor and a nearest danger area 140 (or danger region 142). Accordingly, mapping component 110 can maximize a minimum distance from all or a portion of danger regions included in road map 114 to construct route backbone 132 and, further can assign a direction to one or more segment of the route backbone 132 based upon descending potential values for nodes included in the one or more segment, which is further discussed in connection with FIG. 7-9.

In addition, mapping component 110 can connect exit point 152 or an evacuation entity 162 to the route backbone 132 based upon descending potential values for connected nodes extending from the exit point 152 or the evacuation entity 162 to the route backbone 132. Appreciably, the potential value of the node can be determined based at least in part upon information that propagates from a gateway sensor 170 that corresponds to a gateway node 172 for the road map 114.

In more detail, the information can propagate from the gateway sensor 170 to other sensors in the sensor array 120 that correspond to nodes included in the road map 114, wherein the information includes, e.g., (1) an indication of distance to a nearest danger area 140, denoted $d_c$, (2) an indication of a distance to the gateway sensor 170 that increases as the information propagates to subsequent other sensors, denoted $d_r$, and (3) a direction for the route backbone 132 for nodes along the route backbone 132, denoted D. Accordingly, mapping component 110 can construct route backbone 132 based upon a comparison between multiple nodes included in the road map 114, wherein the comparison selects nodes associated with a larger $d_c$, or a smaller $d_r$ when $d_c$ are equal for compared nodes.

Figure 7:
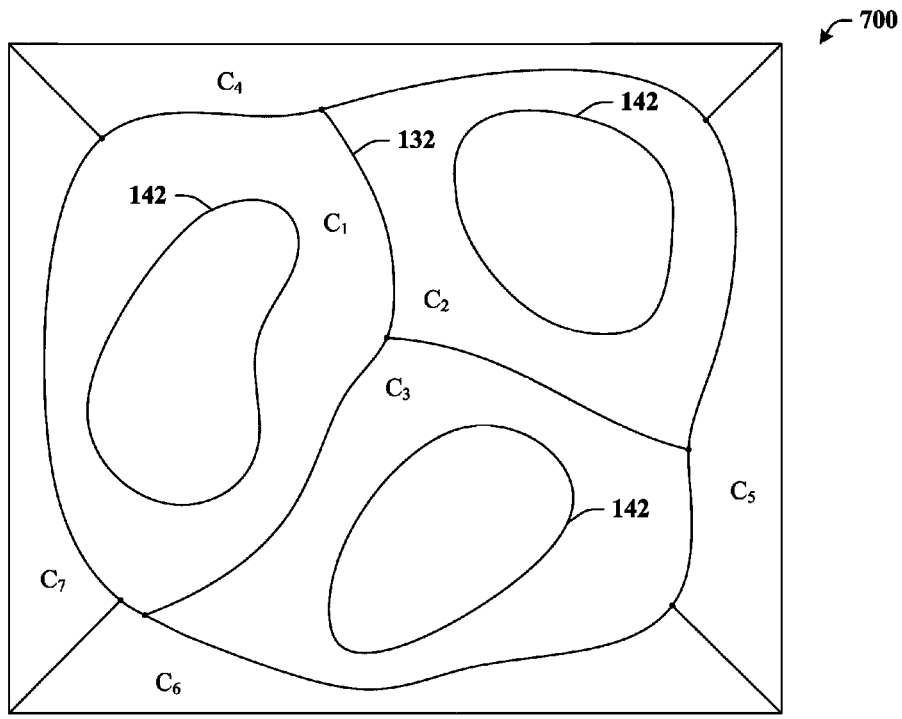
FIG. 7 illustrates a block diagram of a graphic depiction illustrating a basic route backbone with points outside sensor range presumed to be dangerous.
Figure 8:
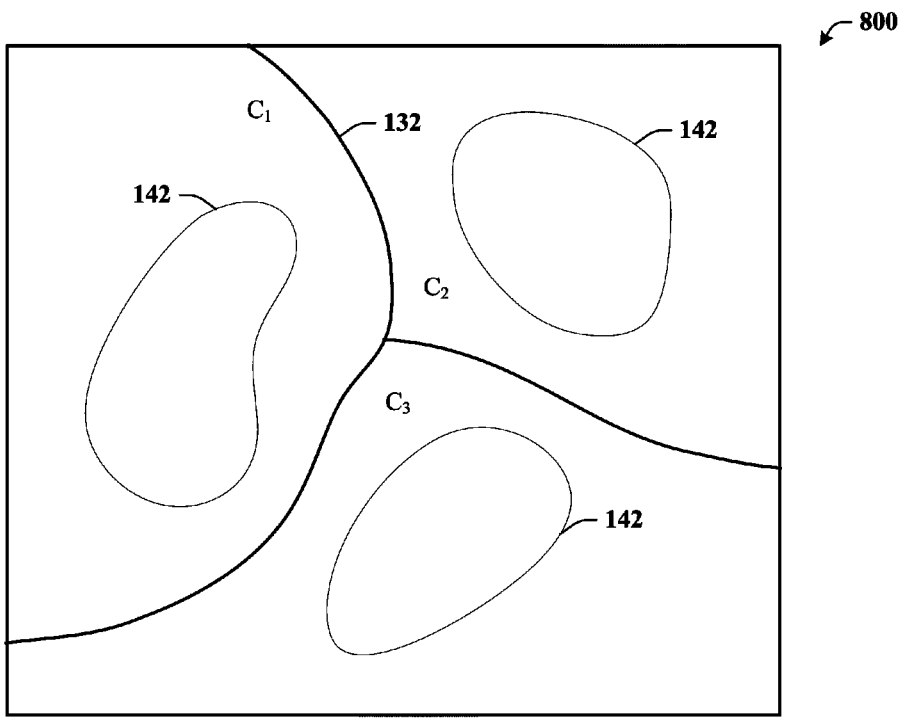
FIG. 8 is a block diagram of a graphic depiction illustrating a basic route backbone with points outside sensor range presumed to be safe.

Referring now to FIGS. 7 and 8 respectively depict two examples of basic route backbones that navigate dangerous regions. The road map framework can divide a region, R, into different components, called cells, which are denoted $C_1$, $C_2 \ldots C_n$. Each cell contains a dangerous area inside it. With the potential value s.potential=1/s.mDist, the ordinary nodes around the dangerous area in the cell comprise a virtual power field. In practical usage, however, when sensor nodes are sparsely deployed over the field, the nodes on the road backbone may not be connected into one component. To solve this difficulty, we compromise the accuracy of the medial axis, letting s.mSet of each node store the boundary nodes of both s.mDist and s.mDist+1 distance to it. By such means, the medial axis is indeed broadened and more nodes are dedicated on the road backbone, largely increasing the connectivity of route backbone 132.

RMB will typically default to treating the area out of the sensor field as dangerous, since without any sensing information about such area we consider it dangerous in order to increase the safety of navigation. The consequent road map is then built as depicted by graphic depiction 700 of FIG. 7, illustrating 7 distinct cells. We can also choose to consider the sensor field boundary safe, for example in the case where we have some preliminary information on the boundary, e.g., the sensor field is indoor environment safely surrounded by walls or fences or the like. In this case, the road map is built as shown by graphic depiction 800 of FIG. 8. Since the two cases are essentially similar, without loss of generality, in the following, we mainly focus on the first case.

To describe the above in consistent terms, in one or more aspect, road map 114 can include multiple danger regions 142 (as well as, potentially, boundaries of road map 114) and mapping component 110 can divide road map 114 into multiple cells (e.g., $C_1 \ldots$) with each cell including exactly one danger region 142 and at least one exit point 152 that represents a boundary along route backbone 132 between at least two adjacent cells or a final destination for an evacuating entity 162.

Figure 9:
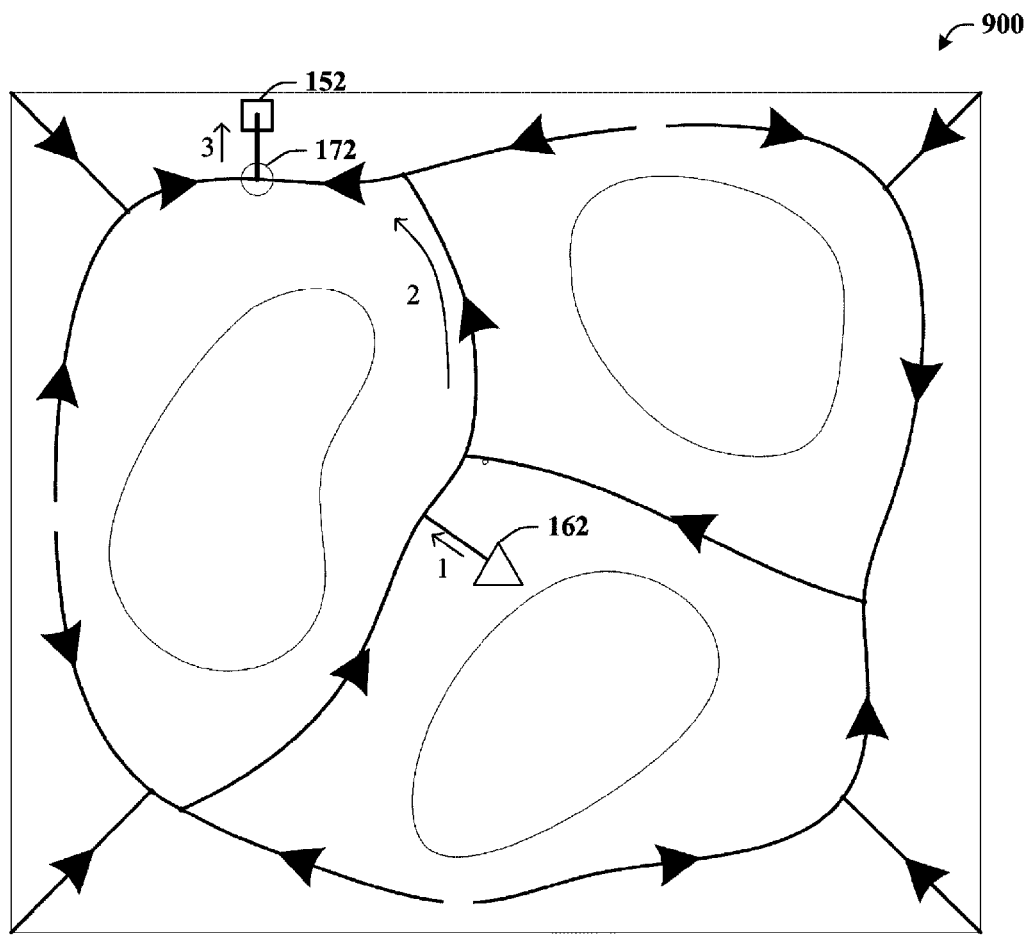
FIG. 9 illustrates a block diagram of a graphic depiction providing a route backbone with direction assignments for segments of the route backbone.

With reference to FIG. 9, graphic depiction 900 provides a route backbone and assigns directions to segments of the route backbone. Appreciably, at this point it is readily apparent that the road map framework can be utilized as a backbone for navigating different users inside the field. Exploring a route from the internal entity (e.g., entity 160, 162) to the exits can therefore include: (1) connecting the exits and internal entity to the road backbone, respectively; (2) assigning directions on the road map; (3) navigating each user to the destination exit.

For the sake of simplicity, assume there is only one exit point 152, even though it should be appreciated that numerous exit points could exist. In order to build a route connecting the exit and the road map backbone, we find the exit in the cells. The route extends from the exit at each point along the most descending direction of the virtual field until it reaches the border of the cell, e.g., the road backbone. In the discrete sensor network, the most descending direction is to select among all its direct neighbors the one which has the least potential value s.potential for a node. The route connecting the destination exit intersects the road backbone at a point we call the gateway (e.g., gateway 170, 172). Building a route connecting the internal entity and the road map backbone is a similar process that the route extends from the internal entities.

Directions for the road map (characterized by graphic depiction 900 as arrows) can indicate a safe path towards the gateway for each point on the backbone. Thus, it is prudent to choose a path maximizing the closest distance to the dangerous areas. Such can be achieved by flooding from the gateway throughout the road backbone. As introduced above, the flooded message F (not shown) contains two items, $d_c$, which records the minimum number of hops to the dangerous areas along the road from the current node to the gateway, and $d_r$, which records the number of hops along the road from the current node to the gateway. The basic idea is to choose a path with a minimum $d_c$, and with shortest $d_r$ while several paths have the same minimum $d_c$. Each point receives the flooded information from different directions. Usually, the flooded information only comes from the two directions along the road but possibly multiple directions at the branch points where multiple roads segments intersect. A suitable programmatic example of this process is detailed in connection with Algorithm 1, listed below.

---
Algorithm 1 Direction Assigning
---

Description:
Phase 1 —Initialization
    For each sensor node on the road backbone
        s.nextHop ← null
        s.rDist ← 0
    End For
Phase 2 —Flooding
    $m.d_c$ ← s.mDist of Gateway node g
    $m.d_r$ ← 0
    g broadcasts m throughout the road backbone
    Function w.Receive(Message m, FromNode v)
        If (s.rDist < $m.d_c$ )
            s.nextHop ← v.ID
            s.rDist ← $m.d_c$
            w.tempDist ← $m.d_r$
            $m.d_r$ ← $m.d_r$ + 1
            $m.d_c$ ← min ($d_c$, s.mDist)
            broadcast m
        End If
        Else
            If ( s.rDist = $m.d_c$ & w.tempDist < $m.d_r$ )
                s.nextHop ← v.ID
                w.tempDist ← $m.d_r$
                $m.d_r$ ← $m.d_r$ + 1
                $m.d_c$ ← min ($d_c$, s.mDist)
                broadcast m
            End If
        End Else
        Else discards m
    End Else

---

In addition, graphic depiction 900 also illustrates that navigating each entity to the destination exit includes three stages: (1) Each entity is guided from the inside of the cell to the road backbone. (2) Along the road backbone, entities from different cells are navigated towards the gateway. (3) The "last-mile" navigation is guided along the route that connects the exit and the gateway on the road map.

Figure 10:
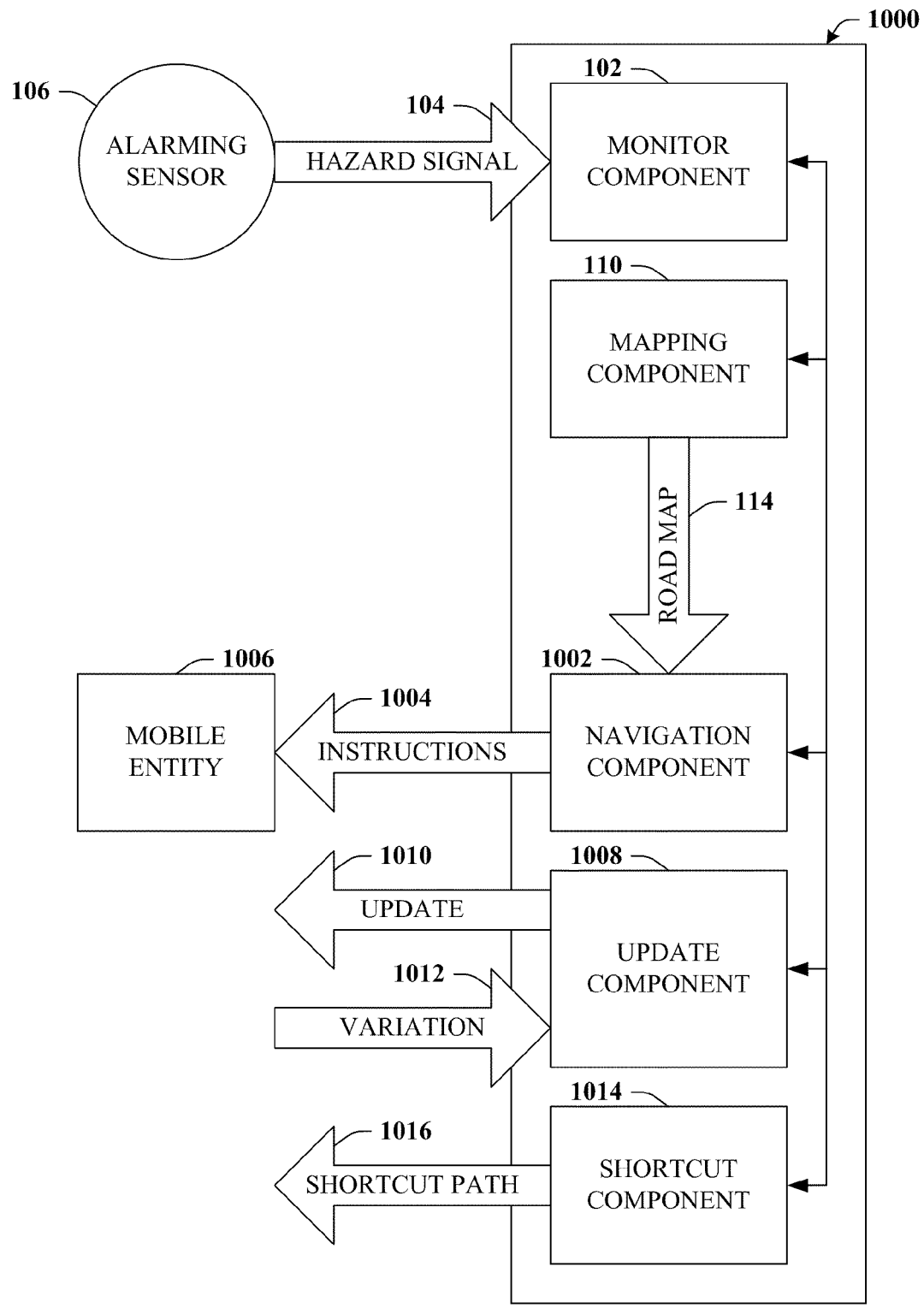
FIG. 10 depicts a block diagram of a computer-implemented system that provides additional features in connection with determining safety-oriented navigation paths through dangerous environments.

Turning now to FIG. 10, computer implemented system 1000 that provides additional features in connection with determining safety-oriented navigation paths through dangerous environments is depicted. Generally, system 1000 can include substantially any suitable feature or aspect discussed in connection with FIG. 1 or elsewhere herein. For example, system 1000 can include monitor component 102 that can receive hazard signal 104 from an alarming sensor 106 as substantially detailed supra. In addition, system 1000 can also include mapping component 110 that can construct road map 114, also previously detailed in connection with system 100.

Additionally or alternatively, system 1000 can further include one or more additional components such as navigation component 1002, update component 1008, and/or shortcut component 114. In more detail, navigation component 1002 that can configure a set of instructions 1004 to guide mobile entity 1006 along at least a portion of recommended path 130 to at least one safe area 150.

On the other hand, update component 1008 can be configured to continuously monitor data received from sensor array 120. Based upon such monitoring, update component 1008 can facilitate at least one real time update 1010 to road map 114 upon detection of variation 1012 for one or more danger area 150 in the local environment 112, which in turn can correspond to one or more danger region 152 in the road map 114.

It should be understood that in one or more aspect, update component 1008 can categorize variation 1010 as one of (1) an expanding variation identified based upon an indication of a nominal sensor 108 that is adjacent to an alarming sensor 106 transitioning to from nominal mode to alarming mode, (2) a shrinking variation identified based upon an indication of an alarming sensor 106 that is adjacent to at least one other alarming sensor 106 transitioning from alarming mode to shrinking mode, (3) an emerging variation identified based upon an indication of a nominal sensor that is adjacent to no alarming sensors transitioning from nominal mode to alarming mode, or (4) a diminishing variation identified based upon an indication of an alarming sensor that is adjacent to no other alarming sensors transitioning from alarming mode to nominal mode.

In accordance therewith, update component 1008 can include in road map 114 an expanding node in connection with the expanding variation and increases dimensions of an adjacent danger region 142 to include the expanding node. Additionally or alternatively, update component 1008 can include in the road map a shrinking node in connection with the shrinking variation and decreases dimension of an adjacent danger region to exclude the shrinking node. Similarly, update component 1008 can include in the road map an emerging node in connection with the emerging variation and add a new danger region to the road map. Likewise, update component 1008 can include in the road map a diminishing node in connection with the diminishing variation and removes an associated danger region from the road map 114.

While the above relates to dynamically redrawing danger regions 142, it should be understood that update component 1008 can also redraw route backbone 132 based upon these changes. For example, update component 1008 can modify a $d_c$ value only for nodes that are nearer to the emerging node or the expanding node than to any other node extant in a danger region 142. As another example, update component 1008 can modify a $d_c$ value only for nodes that are nearer to the shrinking node or the diminishing node than to any other node extant in a danger region 142, wherein a modification to a $d_c$ value facilitates re-construction of the route backbone 132.

In more detail, when reacting to emergency dynamics (e.g., expanding, emerging, shrinking or diminishing danger regions 142), it is readily apparent that for safety of evacuating entity, such changes should be reflected in the route backbone 132. Moreover, due to the emergency dynamics, the dangerous areas might vary during the navigation process, so it is prudent to allow for such changes rapidly. There are several basic types of variation of dangerous areas which include emerging, expanding, shrinking, and diminishing. In RMB, the variation of dangerous areas is considered as a continuous process of switching a series of points into or out of the dangerous areas. The expanding of a dangerous area corresponds to a point beside the dangerous area is switched into the dangerous area. The shrinking of a dangerous area corresponds to a point on the boundary of the dangerous area is switched out of the dangerous area. The emerging of a dangerous area corresponds to a point inside the safe district is switched into a dangerous area. The diminishing of a dangerous area corresponds to the last point of the dangerous area is switched to be safe The updating principle additively rebuilds the road backbone according to the variations of dangerous areas. Each point in the field maintains a status recording the set of the closest dangerous points to it and the distance between them. Each time a point is switched into a dangerous area, we only update those points which will take it as their closest dangerous point. Similarly, each time a point is switched out of a dangerous area, we only update those points which record it as their previously closest dangerous point. Each time a sensor node is switched into or out of the dangerous area, it generates a report and floods it within those nodes that record it in their s.mSet. Those nodes accordingly update their s.mDist and s.mSet. The potential values of s.potential for those nodes are also updated. The road map backbone is then updated, and corresponding nodes update their s.road. The gateway node reinitiates a flood within the road backbone to reassign the path directions Continuing with the discussion of FIG. 10, system 1000 can further include shortcut component 1014 that can identify one or more shortcut path 1016 between two inscribed points extant on the route backbone. The inscribed points, as well as other features associated with optimizing path distance are further detailed infra in connection with FIGS. 11 and 12. However, briefly, shortcut path 1016 can differ from the path described by route backbone 132. Particularly, shortcut path 1016 can represent a shortest distance between the two inscribed points while maintaining a minimum distance from a nearest danger region 142.

Shortcut component 1014 can further facilitate inclusion of the one or more shortcut path 1016 to road map 114, which can be potentially be included in instructions 1004 delivered to mobile entity 1006. It should be appreciated that the existence of a shortcut vis-à-vis route backbone 132 is not necessarily guaranteed to result. Rather, shortcuts are typically the result of the inclusion of multiple danger regions 142. Accordingly, shortcut component 1014 can initiate identification of the one or more shortcut path 1016 when road map 114 is divided into multiple cells.

Moreover, upon identification of the one or more shortcut path 1016, shortcut component 1014 can establish a direction, D, for the one or more shortcut path 1016 consistent with an associated route backbone portion direction. Such can be initiated upon inclusion of the one or more shortcut path to the road map or upon an event signaled when an evacuating entity encounters one of the two inscribed points.

Figure 11:
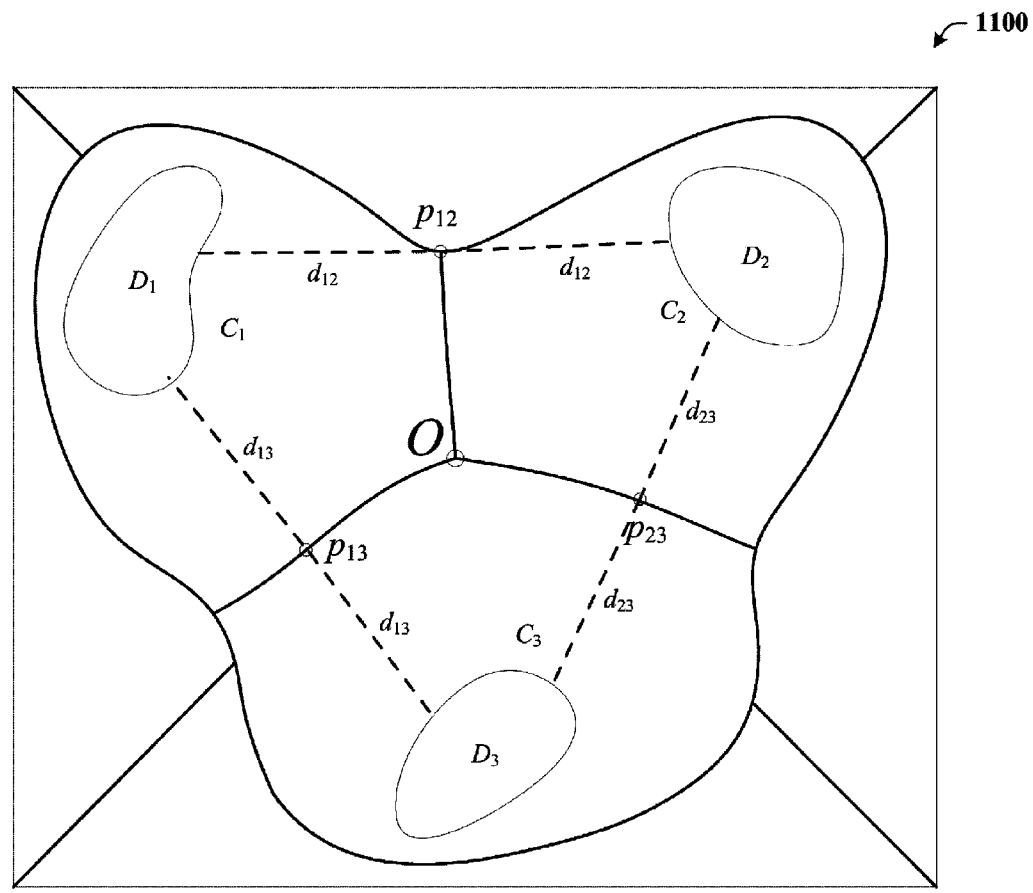
FIG. 11 illustrates a block diagram of a graphic depiction illustrating construction of inscribed points for identifying shortcuts over route backbone.
Figure 12:
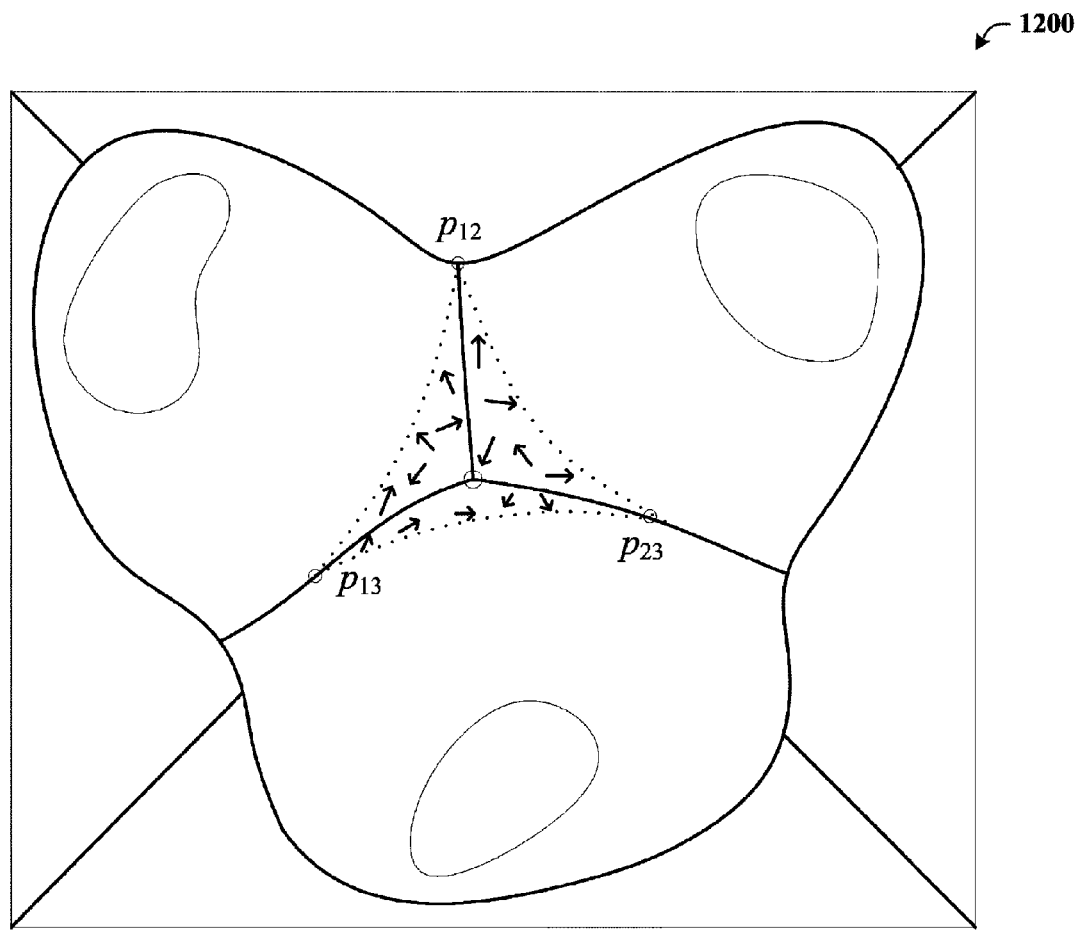
FIG. 12 is a block diagram of a graphic depiction illustrating identification and/or construction of shortcuts.

Turning now simultaneously to FIGS. 11 and 12, graphic depiction 1100 illustrates construction of inscribed points for identifying shortcuts over route backbone, while graphic depiction 1200 illustrates identification and/or construction of shortcuts.

As noted above, given the time factor can be significant in the navigation process, in order to reduce excessively long routes, we modify the road backbone as follows. Let the inscribed points $P=\{p_{ij}|p_{ij}$ is the point on the road backbone between neighboring cells $C_i$ and $C_j$ that has the shortest distance $d_{ij}$ to the dangerous areas $D_i$ and $D_j$, $1 \le i,j \le n\}$, as illustrated by graphic depiction 1100. Accordingly, in each cell we build a shortcut between each pair of neighboring inscribed points. The shortcut is a shortest path connecting two inscribed points that is no closer to the dangerous area than the closest end. It is built through a constraint flooding within the area of points farther to the dangerous area than the two inscribed points, as shown in graphic depiction 1200. These shortcuts are used as supplements for the original roads.

A direction can be assigned to the shortcut if there is a directional path between its two ends on the original road map backbone and the assigned direction is the same with the original direction. For those shortcuts without directional paths between their two ends on the original road map backbone, we simply do not assign any direction for them. Later when the users are navigated along the road map backbone, they will move along those shortcuts with directions if they encounter any.

When there are two or more exits in the field, we can further improve the route safety and efficiency by navigating the users to relatively safer and closer exit. In this case, each exit connects it to the road backbone and floods their gateway information along the backbone. Each point on the backbone selects its direction heading towards the route with the minimum distance to the dangerous areas. Among the routes of the same distance to the dangerous areas, it chooses the shortest one. The resulted directional road is multiple trees rooted at different exit gateways. Again, we can supplement the road map with shortcuts to improve the route efficiency.

With the foregoing in mind, the following propositions in connection with RMB should be readily apparent:

First, the local minimum points of the virtual power field in each cell only reside on the medial axis. This guarantees that we can successfully build a route connecting the exit and the road backbone without halted at an intermediate point of local minimum. Such a route ensures that any point on the route is not closer to the dangerous area than the destination exit.

Second, on the road backbone, from any point to the gateway, the path along the assigned directions maximizes the minimum distance to the dangerous areas.

Third, the selected navigation route maximizes the minimum distance of all possible routes to the dangerous areas. This shows that the selected route provides user guaranteed safety in global span. Each user along the selected route never moves unnecessarily close to the dangerous areas. Meanwhile, the safety is globally guaranteed in the sense that we cannot find another route which is more distant away from the dangerous areas.

Fourth, for any given path segment on the selected navigation route, any substitute path will not be farther to the dangerous areas. This guarantees that any intermediate local path segment on the selected route yields the largest distance to the dangerous areas. We call this property local safety. Local safety provides the user even stronger safety guarantee at each intermediate step such that at any local step, the selected route guides the user through the safest way.

Fifth, the impact of the emergency dynamics in the field is local. When the dangerous area in a cell expands or shrinks continuously, only the points within that cell are affected. The emerging of a new dangerous point affects the points within the newly constructed cell and the diminishing of a dangerous point affects the points within the original cell. In short, any emergency dynamic affects only a local district bounded within the cell of the dangerous area. All points outside this district maintain their original status.

Sixth, after expanding or shrinking one point on A, the average sector-like region affected is of size $O(s'/\sqrt{s})$, assuming the sizes of a dangerous area A and its surrounding cell c are s and s' respectively.

Seventh, the amortized size of the sector-like region affected by the variation of dangerous areas is $O(\sqrt{n})$. In each updating process when emergency varies, our method rebuilds the shape of the new road map with the cost of flooding and updating a local district of an amortized size $O(\sqrt{n})$. After rebuilding the shape of the new road map, we accordingly reassign the directions along the road backbone, which incurs local overhead on the compact backbone.

Eighth, the navigation route explored from the modified road map is a Max-Min route in terms of the distance to the dangerous areas.

Figure 13:
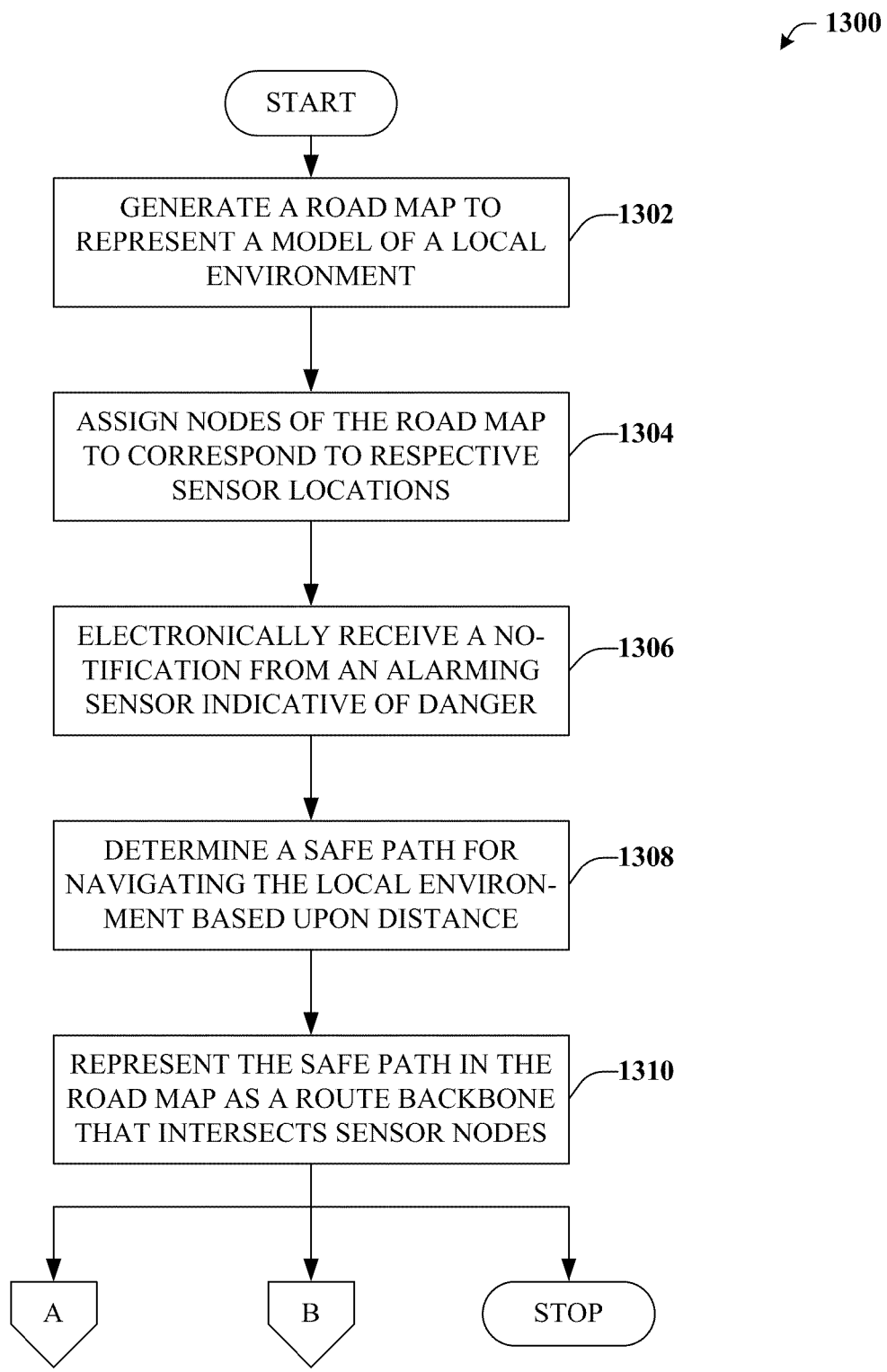
FIG. 13 depicts an exemplary flow chart of procedures that define a method for facilitating safety-based navigational guidance through a dangerous area.
Figure 14:
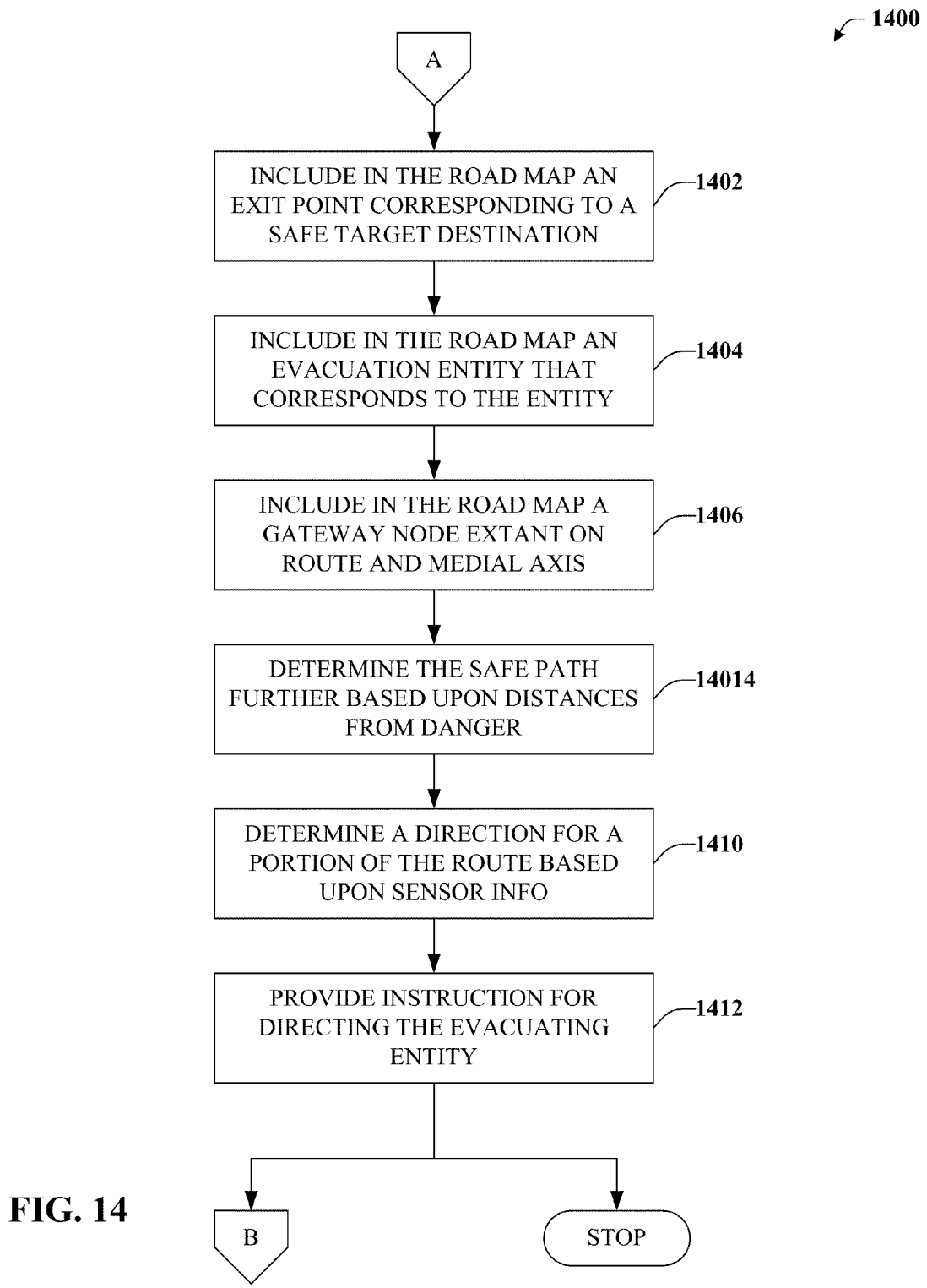
FIG. 14 illustrates an exemplary flow chart of procedures that define a method for providing addition features in connection with for facilitating safety-based navigational guidance through a dangerous area.
Figure 15:
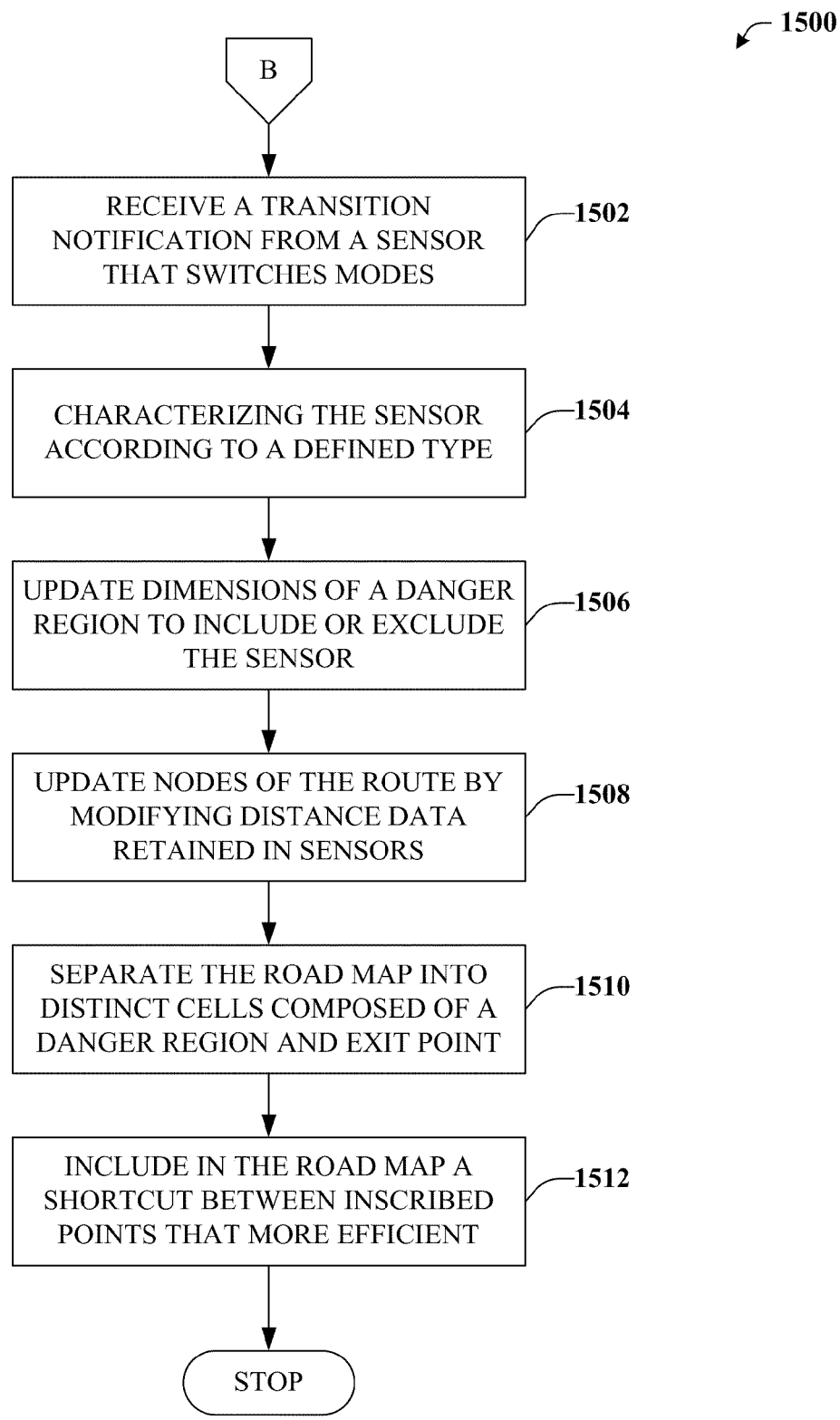
FIG. 15 depicts an exemplary flow chart of procedures defining a method for providing for updating and/or optimizing with respect to a road map for traversing a dynamic environment.

FIGS. 13-15 illustrate various methodologies in accordance with one or more embodiments described herein. While, for purposes of simplicity of explanation, the methodologies are shown and described as a series of acts, it is to be understood and appreciated that the embodiments are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the various embodiments. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 13, exemplary computer implemented method 1300 for facilitating safety-based navigational guidance through a dangerous area is provided. Generally, at reference numeral 1302, a road map can be generated to represent a model of a local environment.

Moreover, at reference numeral 1304, at reference numeral 1304, nodes of the road map can be assigned to correspond to respective locations within the local environment of a set of networked sensors whose sensor detection radii define boundaries for the local environment. Hence, for each sensor that appears in the local environment a corresponding node can be implemented in the road map. These nodes can serve as waypoints when constructing safe paths. Moreover, additional nodes can be added to the road map even when no corresponding sensor exists, which is detailed herein.

At reference numeral 1306, a notification from at least one alarming sensor indicating a presence of danger in an area surrounding the at least one alarming sensor can be received. For example, the notification can be electronically received by suitable hardware such as s receiver or transceiver.

Accordingly, at reference numeral 1308, at least one safe path for navigating the local environment based upon a distance of nominal sensors from the at least one alarming sensor can be determined. These calculations can be employed for construction of a safe route through the local environment. At reference numeral 1310, the at least one safe path in the road map can be represented as a route backbone that intersects nodes that correspond to the nominal sensors included in the at least one safe path.

Referring to FIG. 14, exemplary computer implemented method 1400 for providing addition features in connection with for facilitating safety-based navigational guidance through a dangerous area is depicted. At reference numeral 1402, at least one exit point corresponding to a target destination for a mobile entity in the local environment can be included in the road map. Likewise, at reference numeral 1404, at least one evacuation entity that corresponds to the mobile entity can be included in the road map. Similarly, at reference numeral 1406, a gateway node extant on both the route backbone and a medial axis for the exit point can be included in the road map. Having fully constructed the route backbone and attached the target location to the destination location instructions for navigation can ensue.

However, to provide additional detail, it should be appreciated that, for example, at reference numeral 1408, the at least one safe path for navigating the local environment can be determined further based upon distances from a nearest danger area and from the gateway node acquired by the set of sensors by way of message flooding propagating to successive sensors and origination from a sensor corresponding to the gateway node.

Moreover, at reference numeral 1410, a direction for at least one segment of the route backbone can be determined based upon the information retained or propagated from the set of sensors. Thus, at reference numeral 1412, instructions for directing the evacuating entity to the exit point can be provided while maximizing a minimum distance from a danger area based upon the route backbone.

With reference now to FIG. 15, method 1500 for providing for updating and/or optimizing with respect to a road map for traversing a dynamic environment is illustrated. At reference numeral 1502, a transition notification can be received from at one sensor in the set of sensors indicating the at least one sensor has switched from a nominal mode to an alarming mode or switched from an alarming mode to a nominal mode. Accordingly, emergence dynamics, for example, and be detected and accounted for.

For instance, at reference numeral 1504, the at least one sensor can be characterized as one of an expanding node, a shrinking mode, an emerging node, or a diminishing node based upon the transition notification and whether any node adjacent to the at least one node corresponds to an alarming sensor. Such characterization is described in more detail supra. As a result of such characterization, at reference numeral 1506, dimensions of a danger region can be updated to include or exclude the at least one sensor, again, based upon the characterizing of reference numeral 1504.

Moreover, at reference numeral 1508, nodes of the route backbone can be updated by modifying distance data retained by corresponding sensors by way of message flooding only for sensors in which the at least one sensor newly represents a nearest danger region or was previously designated as the nearest danger region.

At reference numeral 1510, the road map can be separated into distinct cells with each cell comprising a single danger region and at least one exit point representing a boundary along the route backbone between at least two adjacent cells or an original exit point.

In addition, at reference numeral 1512, at least one shortcut between two inscribed points existing on the route backbone can be included in the road map. It should be appreciated that the shortcut path differs from the route backbone and further represents a shortest distance between the two inscribed points while maintaining a minimum distance from a nearest danger region.

Figure 16:
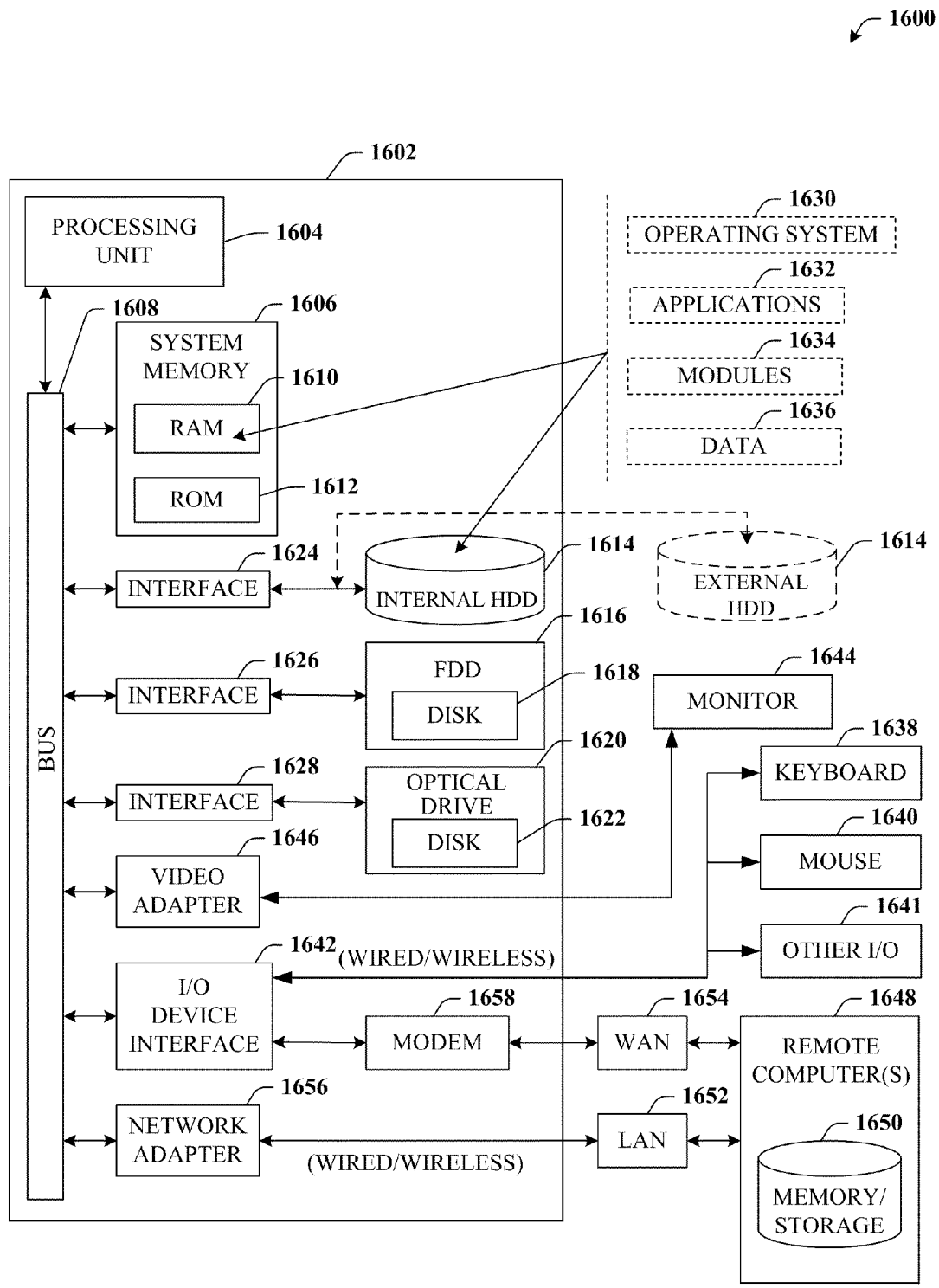
FIG. 16 illustrates a block diagram of a computer operable to execute or implement all or portions of the disclosed architecture.

Referring now to FIG. 16, there is illustrated a block diagram of an exemplary computer system operable to execute the disclosed architecture. In order to provide additional context for various aspects of embodiment(s) described herein, FIG. 16 and the following discussion are intended to provide a brief, general description of a suitable computing environment 1600 in which the various aspects of can be implemented. Additionally, while one or more embodiments described above may be suitable for application in the general context of computer-executable instructions that may run on one or more computers, those skilled in the art will recognize that such embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media can include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 16, the exemplary environment 1600 for implementing various aspects includes a computer 1602, the computer 1602 including a processing unit 1604, a system memory 1606 and a system bus 1608. The system bus 1608 couples to system components including, but not limited to, the system memory 1606 to the processing unit 1604. The processing unit 1604 can be any of various commercially available processors. Dual microprocessors and other multi-processor architectures may also be employed as the processing unit 1604.

The system bus 1608 can be any of several types of bus structure that may further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 may also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the various embodiments.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is appreciated that the various embodiments can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices 1641 may include a speaker, a microphone, a camera or another imaging device, an IR remote control, a joystick, a game pad, a stylus pen, touch screen, or the like. These and other input devices are often connected to the processing unit 1604 through an input-output device interface 1642 that can be coupled to the system bus 1608, but can be connected by other interfaces, such as a parallel port, an IEEE1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 may operate in a networked environment using logical connections via wired and/or wireless communications to one or more remote computers, such as a remote computer(s) 1648. The remote computer(s) 1648 can be a workstation, a server computer, a router, a personal computer, a mobile device, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which may connect to a global communications network, e.g., the Internet.

When used in a LAN networking environment, the computer 1602 is connected to the local network 1652 through a wired and/or wireless communication network interface or adapter 1656. The adapter 1656 may facilitate wired or wireless communication to the LAN 1652, which may also include a wireless access point disposed thereon for communicating with the wireless adapter 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 16 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 17:
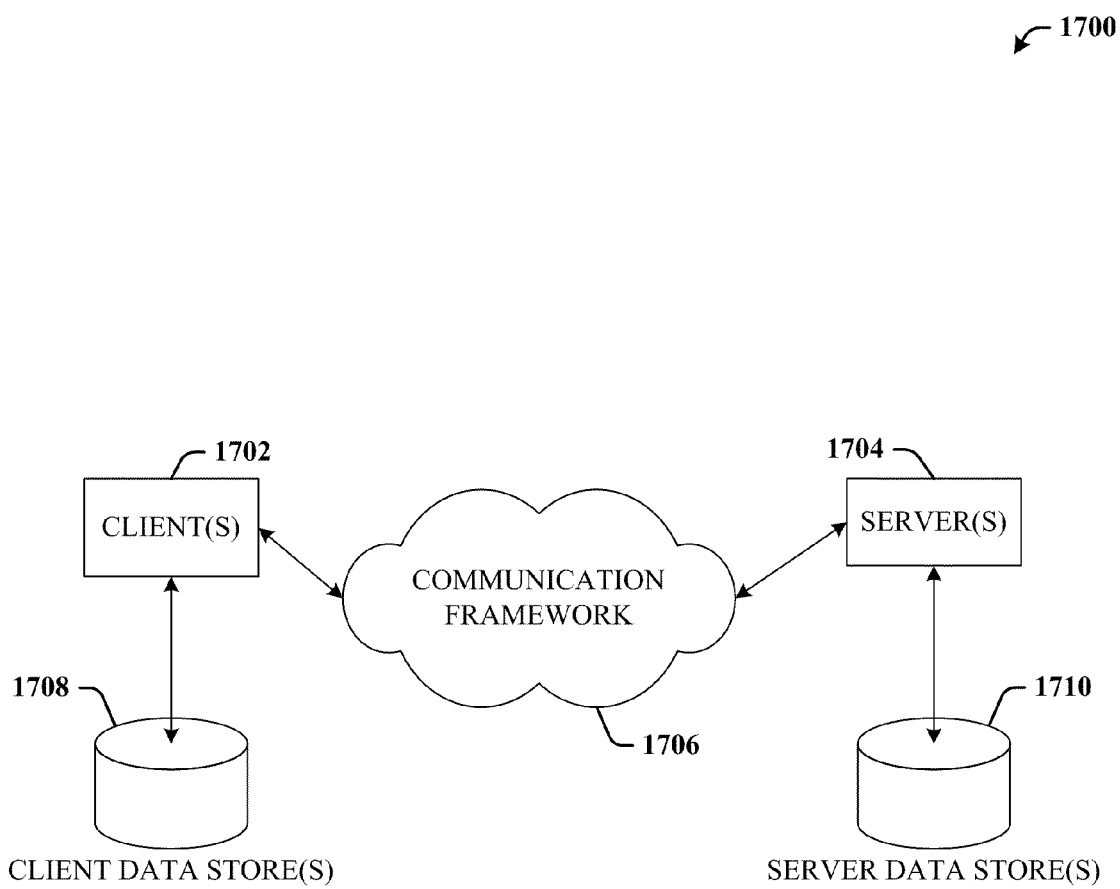
FIG. 17 illustrates a schematic block diagram of an exemplary computing environment.

Referring now to FIG. 17, there is illustrated a schematic block diagram of an exemplary computer compilation system operable to execute the disclosed architecture. The system 1700 includes one or more client(s) 1702. The client(s) 1702 can be hardware and/or software (e.g., threads, processes, computing devices). The client(s) 1702 can house cookie(s) and/or associated contextual information by employing one or more embodiments described herein, for example.

The system 1700 also includes one or more server(s) 1704. The server(s) 1704 can also be hardware and/or software (e.g., threads, processes, computing devices). The servers 1704 can house threads to perform transformations by employing one or more embodiments, for example. One possible communication between a client 1702 and a server 1704 can be in the form of a data packet adapted to be transmitted between two or more computer processes. The data packet may include a cookie and/or associated contextual information, for example. The system 1700 includes a communication framework 1706 (e.g., a global communication network such as the Internet) that can be employed to facilitate communications between the client(s) 1702 and the server(s) 1704.

Communications can be facilitated via a wired (including optical fiber) and/or wireless technology. The client(s) 1702 are operatively connected to one or more client data store(s)

1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system that determines safety-oriented navigation paths, comprising:
a monitor component configured to receive a hazard signal from at least one alarming sensor included in a sensor array distributed in a local environment bounded by a detection radius of the sensor array, wherein the hazard signal indicates a detected presence of danger proximal to the at least one alarming sensor, and wherein a sensor from the sensor array is not required to maintain location information relating to a location within the local environment; and
a mapping component configured to construct a road map scaled to dimensions of the local environment, wherein the road map includes a route backbone that depicts one or more recommended paths through the local environment selected based on a distance that satisfies a defined condition with respect to reduction of distance from the detected presence of danger.

2. The system of claim 1, wherein the route backbone comprises a set of edges that join a sequence of adjacent nodes that correspond to respective locations within the local environment of nominal sensors included in the sensor array.

3. The system of claim 1, wherein at least one of:
the mapping component further identifies at least one safe area within the local environment and plots an exit point on the road map that corresponds with the at least one safe area;
the mapping component further identifies at least one mobile entity extant in the local environment and plots at least one evacuating entity that corresponds to the at least one mobile entity on the road map connected to a proximal point of the route backbone; or
the mapping component connects at least one exit point to the route backbone with an edge that intersects a proximal point, denoted a gateway, on the route backbone and depicts a recommended path through the local environment.

4. The system of claim 3, wherein the mapping component connects the at least one exit point to the gateway of the route backbone based upon a concatenation of a medial axis of the exit point.

5. The system of claim 4, wherein the medial axis includes a set of points, wherein a point from the set of points is a minimum distance from at least two danger regions.

6. The system of claim 1, wherein the mapping component includes in the road map at least one danger region that encompasses a contiguous set of alarming sensors and that corresponds to a danger area in the local environment.

7. The system of claim 6, wherein the mapping component treats regions beyond the local environment that correspond to areas outside the detection radius of the sensor array as one or more of the at least one danger region or the mapping component treats at least one region beyond the local environment that corresponds to areas outside the detection radius of the sensor array as a safe region and plots an exit point to correspond to the safe region.

8. The system of claim 1, wherein the mapping component assigns a potential value to a node included in the road map based at least in part upon data received from a corresponding sensor, wherein the potential value is inversely proportional to a distance between the corresponding sensor and a nearest danger area.

9. The system of claim 8, wherein at least one of:
the mapping component maximizes a minimum distance from all or a portion of danger regions included in the road map to construct the route backbone and further assigns a direction to one or more segment of the route backbone based upon descending potential values for nodes included in the one or more segment;
the mapping component connects an exit point or an evacuation entity to the route backbone based upon descending potential values for connected nodes extending from the exit point or the evacuation entity to the route backbone; or
the potential value of the node is determined based at least in part upon information that propagates from a gateway sensor that corresponds to a gateway for the road map.

10. The system of claim 9, wherein information propagates from the gateway sensor to other sensors in the sensor array that correspond to nodes included in the road map, wherein the information includes an indication of distance to a nearest danger area, denoted $d_c$, an indication of a distance to the gateway sensor that increases as the information propagates to subsequent other sensors, denoted $d_r$, and a direction for the route backbone for nodes along the route backbone, denoted D.

11. The system of claim 10, wherein the mapping component constructs the route backbone based upon a comparison between multiple nodes included in the road map, wherein the comparison selects nodes associated with a larger $d_c$, or a smaller $d_r$ when $d_c$ are equal for compared nodes.

12. The system of claim 1, wherein the road map includes multiple danger regions and the mapping component divides the road map into multiple cells with each cell including exactly one danger region and at least one exit point that represents a boundary along the route backbone between at least two adjacent cells or a final destination for an evacuating entity.

13. The system of claim 1, further comprising a navigation component that configures a set of instructions to guide the mobile entity along at least a portion of the recommended path to at least one safe area.

14. The system of claim 1, further comprising an update component configured to continuously monitor data received from the sensor array and that facilitates at least one real time update to the road map upon detection of a variation of one or more danger area in the local environment that corresponds to one or more danger region in the road map.

15. The system of claim 14, wherein at least one of:
   the update component categorizes the variation as one of (1) an expanding variation identified based upon an indication of a nominal sensor that is adjacent to an alarming sensor transitioning from nominal mode to alarming mode, (2) a shrinking variation identified based upon an indication of an alarming sensor that is adjacent to at least one other alarming sensor transitioning from alarming mode to nominal mode, (3) an emerging variation identified based upon an indication of a nominal sensor that is adjacent to no alarming sensors transitioning from nominal mode to alarming mode, or (4) a diminishing variation identified based upon an indication of an alarming sensor that is adjacent to no other alarming sensors transitioning from alarming mode to nominal mode;
   the update component includes in the road map an expanding node in connection with the expanding variation and increases dimensions of an adjacent danger region to include the expanding node; includes in the road map a shrinking node in connection with the shrinking variation and decreases dimension of an adjacent danger region to exclude the shrinking node; includes in the road map an emerging node in connection with the emerging variation and adds a new danger region to the road map; or includes in the road map a diminishing node in connection with the diminishing variation and removes an associated danger region from the road map; or
   the update component modifies a $d_c$ value only for nodes that are nearer to the emerging node or the expanding node than to any other node extant in a danger region, or the update component modifies a $d_c$ value only for nodes that are nearer to the shrinking node or the diminishing node than to any other node extant in a danger region, wherein a modification to a $d_c$ value facilitates re-construction of the route backbone.

16. The system of claim 1, further comprising a shortcut component that identifies one or more shortcut path between two inscribed points extant on the route backbone, wherein the shortcut path differs from the route backbone and represents a shortest distance between the two inscribed points while maintaining a minimum distance from a nearest danger region, and wherein at least one of:
   the shortcut component facilitates inclusion of the one or more shortcut path to the road map;
   the shortcut component initiates identification of the one or more shortcut path when the road map is divided into multiple cells; or
   the shortcut component establishes a direction for the one or more shortcut path consistent with an associated route backbone portion direction upon inclusion of the one or more shortcut path to the road map or upon an event signaled when an evacuating entity encounters one of the two inscribed points.

* * * * *

UNITED STATES PATENT AND TRADEMARK OFFICE
CERTIFICATE OF CORRECTION

PATENT NO.       : 8,626,444 B2                                          Page 1 of 1
APPLICATION NO.  : 12/720889
DATED            : January 7, 2014
INVENTOR(S)      : Li et al.

It is certified that error appears in the above-identified patent and that said Letters Patent is hereby corrected as shown below:

On the Title Page, Item (54) and in the Specification, at Column 1, line 1, please change the patent title from "SAFETY BASED ROAD MAP NAVIGATION" to "SAFETY-BASED ROAD MAP NAVIGATION".

Signed and Sealed this
Twenty-fifth Day of March, 2014

Michelle K. Lee
*Deputy Director of the United States Patent and Trademark Office*